United States Patent
Kondo et al.

(10) Patent No.: US 6,476,941 B1
(45) Date of Patent: *Nov. 5, 2002

(54) SOLID-STATE IMAGE SENSING DEVICE AND OPERATION METHOD THEREOF

(75) Inventors: Kenichi Kondo; Toshikazu Yanai, both of Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/052,332

(22) Filed: Mar. 31, 1998

(30) Foreign Application Priority Data

Apr. 2, 1997 (JP) .............................................. 9-083905
Oct. 21, 1997 (JP) .............................................. 9-288530

(51) Int. Cl.$^7$ ............................. H04N 1/46; H04N 1/04; H04N 3/14
(52) U.S. Cl. ........................ 358/513; 38/482; 348/314
(58) Field of Search ................................. 358/482, 483, 358/453, 474, 513, 447; 348/302, 303, 304, 311, 314–319; 382/312

(56) References Cited

U.S. PATENT DOCUMENTS

| | | | | |
|---|---|---|---|---|
| 4,691,114 A | * | 9/1987 | Hasegawa et al. .......... 250/578 |
| 4,734,787 A | * | 3/1988 | Hayashi ....................... 358/293 |
| 5,274,476 A | * | 12/1993 | Lee .............................. 358/483 |
| 5,363,137 A | * | 11/1994 | Suga et al. .................. 348/302 |
| 5,786,852 A | * | 7/1998 | Suzuki et al. ............... 348/312 |
| 5,801,850 A | * | 9/1998 | Maki et al. .................. 358/483 |
| 5,995,675 A | * | 11/1999 | Hwang ........................ 382/268 |

* cited by examiner

*Primary Examiner*—Madeleine Nguyen
(74) *Attorney, Agent, or Firm*—Morgan & Finnegan, LLP

(57) ABSTRACT

Charges are transferred from vertical charge transfer devices of a solid-state image sensing device to horizontal charge transfer device via buffer storage cells. Charges obtained from a unessential area out of the transferred charges are discarded by operating the horizontal charge transfer device, and charges obtained from a specific area out of the transferred charges are normally read out by operating the horizontal charge transfer device. When there is a remaining charge in the horizontal charge transfer device after reading charges from the specific area, charges are transferred from the vertical charge transfer devices to the horizontal charge transfer device so that the remaining charge is added only to a charge obtained from the unessential area. Further, charges are transferred in the vertical charge transfer devices in the vertical direction while discarding unessential charges.

46 Claims, 18 Drawing Sheets

AT t10

N-TH FIELD, 480-TH LINE
⋮
N-TH FIELD, 361-ST LINE
N-TH FIELD, 360-TH LINE
⋮
N-TH FIELD, 121-ST LINE
[ (N-1)-TH FIELD, 480-TH LINE ]
+ [ N-TH FIELD, 120-TH LINE ]
⋮
[ (N-1)-TH FIELD, 241-ST LINE ]
+ [ N-TH FIELD, 1-ST LINE ]

AT t11

N-TH FIELD, 480-TH LINE
⋮
N-TH FIELD, 361-ST LINE

AT t12

(N+1)-TH FIELD, 480-TH LINE
⋮
(N+1)-TH FIELD, 361-ST LINE
(N+1)-TH FIELD, 360-TH LINE
⋮
(N+1)-TH FIELD, 121-ST LINE
[ N-TH FIELD, 480-TH LINE ]
+ [ (N+1)-TH FIELD, 120-TH LINE ]
⋮
[ N-TH FIELD, 361-ST LINE ]
+ [ (N+1)-TH FIELD, 1-ST LINE ]

SOLID-STATE IMAGE SENSING DEVICE AND OPERATION METHOD THEREOF

BACKGROUND OF THE INVENTION

The present invention relates to a solid-state image sensing device and an operation method thereof and, more particularly, to a solid-state image sensing device and an operation method for scanning a predetermined area of the solid-state image sensing device.

With the progress of manufacturing technique of a charge coupled device (CCD), the density of pixels in the CCD increases. Further, a number of image sensing apparatuses, such as a video camera and a digital still camera, which adopt scanning method for scanning a predetermined area out of a readable area of the CCD (partial scanning) to realize anti-vibration mechanism, electronic zooming mechanism, display of a reduced image on a liquid crystal display as a finder, and so on, have been commercialized. Furthermore, partial scanning is also applied to automatic focusing and automatic iris diaphragm control. Accordingly, various partial scanning method are used in dependence upon utilization purposes. Some digital still cameras have a function of partial scanning for taking sequence photographs in low resolution so as to increase the number of photographs taken in unit time, in addition to a function for taking a normal high resolution and high quality photograph.

An example of conventional partial scanning operation performed in a digital still camera will be explained below.

FIG. 10 is a view showing a configuration of an interline (interlace) scanning type CCD which is widely used at present. In FIG. 10, reference numeral 10 denotes photodiodes (PDs) which perform photoelectric conversion; 11, four-phase drive vertical charge coupled devices (VCCDs) for transferring signal charges of the PDs 10; 12, horizontal charge coupled device (HCCD) for transferring the signal charges transferred from the VCCDs 11 by line; and 13, an output amplifier for converting each signal charge representing a pixel, transferred via the HCCD 12, into a voltage signal.

The CCD as described above is operated by an operation unit 200 which controls VCCD operation signals φV1 to φV4 for operating the VCCDs 11 and HCCD operation signals φH1 and φH2 for operating the HCCD 12 and outputs as timing pulses at proper levels.

In this type of CCD, normally, signal charges stored in the PDs 10 are transferred to the adjoining VCCDs 11, then pairs of signal charges of adjoining pixels in the vertical direction are added by two adjoining lines. Thereafter, the signal charges added by two lines are sequentially read out via the HCCD 12 as signal charges of interlaced single lines. The combinations of two lines to be added are alternatively changed in each field period as shown by "field mode" in FIG. 10. Besides the aforesaid "field mode" scanning method, there is a method for reading each signal charge independently without adding the signal charges. In this case, charges stored in pixels either in the odd lines or in the even lines are alternatively scanned in each field period (referred to as "frame mode" hereinafter).

Next, an output unit of the CCD is explained.

FIG. 11 is a schematic illustrating a configuration of an output unit of the CCD as an image sensing device. In FIG. 11, reference numeral 101 denotes a transfer gate of the last element of the two-phase drive HCCD 12 A signal charge is transferred to a floating diffusion gate 103 via an output gate 102 (normally, it is fixed to a predetermined potential) by operating the potential of the transfer gate 101 from High to Low. The signal charge transferred to the floating diffusion gate 103 is then converted to a voltage signal corresponding to the potential of the floating diffusion gate 103 by the output amplifier 13. The output amplifier 13 is usually configured as a source follower.

Further, reference numeral 104 denotes a reset gate which functions as a "wall" when storing signal charges by applying a Low potential and drains the signal charge in the floating diffusion gate 103 to a reset drain 105 by applying a High potential.

FIG. 12 shows conceptual views illustrating potential profiles of the elements shown in FIG. 11 and a flow of signal charges, and FIG. 13 is a timing chart of a pulse signal (φH2) to be applied to the two-phase drive HCCD 12, a pulse signal (φR) to be applied to the reset gate 104, and a resultant output voltage (Vccdout).

Referring to FIGS. 11 to 13, before reading a signal charge stored in each pixel (i.e., before time ts), residual charge in the floating diffusion gate 103 is drained at time tr. Below, the time tr is called "reset time", time tf is called "field through time", an output signal level at the field through time tf is called "field through level", the time ts is called "image signal transfer time", and an output signal level at the image signal transfer time ts is called "image signal level".

Regarding frequencies of operation signals for the CCD, the highest frequency is limited in dependence upon performance of the amplifier 13. An output from the CCD is applied with correlated double sampling (CDS) outside of the CCD, then amplified. In order to properly perform the above processes on the output from the CCD, sufficient duration of the output signal (Vccdout) at field through level as well as at image signal level is required.

Further, it is also necessary to remove effects of irregularity at the leading and trailing edges of operation signals for the HCCD 12 and the reset pulse φR. Further, there is a limitation due to frequency characteristics of the output amplifier 13. With the aforesaid limitations, the frequencies of operation signals for the CCD are usually about 10 MHz. Note, when it is assumed that there is no foregoing limitation, frequencies of operation signals capable of securing necessary transfer efficiency for obtaining a non-deteriorated image via the HCCD is higher than 10 MHz, and may be several times higher than that.

Next, an operation for scanning a central area of 640×480 pixels of a 960×600-pixel CCD is explained with reference to FIG. 14. In the 960×600-pixel CCD, the number of lines scanned in each field period is 300 either in the field mode or in the frame mode (in the field mode, signals of pair of adjoining pixels are combined to generate signals of 300 lines, and in the frame mode, signals either in the odd lines or the even lines of the 600 lines, namely 300 lines, are outputted).

First, right after transferring signal charges in the PDs 10 to VCCDs 11 at time t1 (in the field mode, right after the signal charges of two pixels are added in VCCDs 11 since charges are added as soon as they are transferred to VCCDs 11), VCCDs 11 are operated at high speed to transfer charges of first 30 (=(300−240)/2) lines to discard the charges to a drain via the HCCD 12 during period t2. In a video camera, this operation is performed during vertical blanking period.

Since it is necessary to keep normal transfer efficiency during the discarding of the charges of the 30 lines, the frequencies of operation signals at this time is set between about 300 kHz and about 400 kHz. Since capacitance of the VCCDs 11 is large, the frequencies of the operation signals for operating the CCD is limited to the above, at most.

The drain may be arranged in parallel to the HCCD 12, or downstream of the HCCD 12. Further, the drain may be substituted by a drain configured in the output amplifier 13. Further, according to FIG. 14, operation signals are also applied to the HCCD 12 during the period t2 for transferring from the VCCDs 11, the signal charges of the 30 lines to be discarded. However, there is a method for temporarily storing the charges to be discarded in HCCD 12. In this case, right after the charges of 30 lines to be discarded are transferred to HCCD 12, the charges are transferred via HCCD 12 at high speed (normally, at tens of MHz) to be discarded, during period t3.

After discarding the unnecessary charges of the 30 lines via the VCCDs 11 and the HCCD 12, signal charges of 240 lines are sequentially read out, by line, in accordance with a horizontal synchronizing signal in period t4. Accordingly, in a video camera, when the number of pixels of the CCD in each line is 960, it is operated at about 16 MHz. Out of information on each line of 960 pixels, information on the central 640 pixels is read out using a memory as a buffer, in accordance with an operation signal. After reading 240 lines, signal charges of the remaining 30 lines are discarded at high speed in period t5. The charge discarding operation, at this time, is performed in the same manner as that described above for discarding the charges of the first 30 lines, and the signal charges of the remaining 30 lines are transferred in accordance with operation pulses of 300 to 400 kHz during vertical blanking period so as to transfer the signal charges at normal transfer efficiency.

In the aforesaid partial scanning method, however, there are following problems.

(1) Signal charges of unnecessary lines are drained, however, in a line which includes necessary signal charges, signal charges of all the pixels in the line, including unnecessary signal charges, are also read out. Therefore, the number of pixels in a line must be within the number of pixels which can be read in a line display period at video rate. In present, operation speed in the horizontal direction is ten plus MHz, thus, the maximum number of the pixels in each line is limited to about 1000. Further, to scan all the pixels in the line and output a part of them in synchronization with the line display period at video rate, it is necessary to temporarily store image signals of all the pixels in memory and output image signals of the part of the pixels after changing time scale so as to match the line display period. This operation makes the control complicated.

(2) The limitation explained in the problem (1) is on a video camera. In a digital still camera or a camera for a personal computer, for instance, there is more freedom in operation speed. However, high operation speed for scanning a part of an image is still demanded. Accordingly, time for reading unnecessary charges in the conventional method prevents overall operation speed from increasing in the above devices.

(3) Furthermore, the vertical and horizontal blanking periods which are bounded by a conventional video rate are useless in a digital still camera which may be required to read an image at high speed. Moreover, in a digital still camera, there is a demand for shortening the time gap between when a shutter button is pressed and when an image is actually read out. In addition, scanning operation performed at a high frame rate is also required for photometry.

SUMMARY OF THE INVENTION

The present invention has been made in consideration of the above situation, and has as its object to provide partial scanning method capable of reading a predetermined area of a solid-state image sensing device at high speed and a solid-state image sensing device.

According to the present invention, the foregoing object is attained by providing a partial scanning method for reading a necessary charge from a predetermined first area of a solid-state image sensing device and discarding a unnecessary charge from a second area which is other than the first area, while scanning the solid-state image sensing device having pixel elements for storing charges, vertical charge transfer devices, arranged in parallel, for transferring charges stored in the pixel elements toward a horizontal charge transfer device, and the horizontal charge transfer device for transferring charges to output the charges to outside of the solid-state image sensing device, the method comprising: a first charge transfer step of transferring charges from the vertical charge transfer devices to the horizontal charge transfer device; a discarding step of discarding charges, out of the charges transferred in the first charge transfer step, obtained from the second area by operating the horizontal charge transfer device; a reading step of reading charges, out of the charges transferred in the first charge transfer step, obtained from the first area by operating the horizontal charge transfer device; and a second charge transfer step of, when there is a remaining charge in the horizontal charge transfer device after the reading step, transferring charges from the vertical charge transfer devices to the horizontal charge transfer device so that the remaining charge is added only to a charge obtained from the second area, wherein the discarding step, the reading step and the second charge transfer step are repeatedly performed during period when charges in horizontal lines, of the solid-state image sensing device, including charges obtained from the first area, are transferred from the vertical charge transfer devices to the horizontal charge transfer device.

According to the present invention, the foregoing object is also attained by providing a partial scanning method for reading a necessary charge from a predetermined first area of a solid-state image sensing device and discarding a unnecessary charge from a second area which is other than the first area, while scanning the solid-state image sensing device having pixel elements for storing charges, vertical charge transfer devices, arranged in parallel, for transferring charges stored in the pixel elements toward a horizontal charge transfer device, the horizontal charge transfer device for transferring charges to output the charges to outside of the solid-state image sensing device, and a buffer storage device provided between the vertical charge transfer devices and the horizontal charge transfer device, the method comprising: a first charge transfer step of transferring charges from the vertical charge transfer devices to the buffer storage device; a second charge transfer step of transferring charges from the buffer storage device to the horizontal charge transfer device; a discarding step of discarding charges, out of the charges transferred in the second charge transfer step, obtained from the second area by operating the horizontal charge transfer device; a reading step of reading charges, out of the charges transferred in the second charge transfer step, obtained from the first area by operating the horizontal charge transfer device; a third charge transfer step of transferring charges in the vertical charge transfer devices toward the buffer storage device in the discarding step; and a fourth charge transfer step of, when there is a remaining charge in the horizontal charge transfer device after the reading step, transferring charges from the buffer storage device to the horizontal charge transfer device so that the remaining charge is added only to a charge obtained from the second area, wherein the discarding step, the reading step, the third charge transfer step, and the fourth charge transfer step are repeatedly performed during period when charges in horizontal lines, of the solid-state image sensing device, including charges obtained from the first area, are transferred from the vertical charge transfer devices to the horizontal charge transfer device.

Further, the foregoing object is also attained by providing a partial scanning method for reading a necessary charge from a predetermined first area of a solid-state image sensing device and discarding a unnecessary charge from a second area which is other than the first area, while scanning the solid-state image sensing device having pixel elements for storing charges, vertical charge transfer devices, arranged in parallel, for transferring charges stored in the pixel elements toward a horizontal charge transfer device, and the horizontal charge transfer device for transferring charges to output the charges to outside of the solid-state image sensing device, the method comprising: a charge transfer step of, when there is a remaining charge in the vertical charge transfer devices after all the charges obtained from the first area are transferred from the vertical charge transfer device to the horizontal charge transfer device, transferring charges from the pixel elements to the vertical charge transfer devices so that the remaining charge is added only to a charge obtained from the second area.

Furthermore, the foregoing object is also attained by providing a solid-state image sensor comprising: pixel elements for storing charges; a horizontal charge transfer device for transferring charges to output the charges to outside of the solid-state image sensor; vertical charge transfer devices, arranged in parallel, for transferring charges stored in the pixel elements toward the horizontal charge transfer device; and a buffer storage device, provided between the vertical charge transfer devices and the horizontal charge transfer device, for enabling to operate the vertical charge transfer devices during operating the horizontal charge transfer device.

Further, the foregoing object is also attained by providing a solid-state image sensor comprising: pixel elements for storing charges; a horizontal charge transfer device for transferring charges to output the charges to outside of the solid-state image sensor; vertical charge transfer devices, arranged in parallel, for transferring charges stored in the pixel elements toward the horizontal charge transfer device; and a gate provided between the vertical charge transfer devices and the horizontal charge transfer device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

<First Embodiment>

The first embodiment of the present invention will be explained with reference to FIGS. 1 to 9 and 18.

Figure 1:
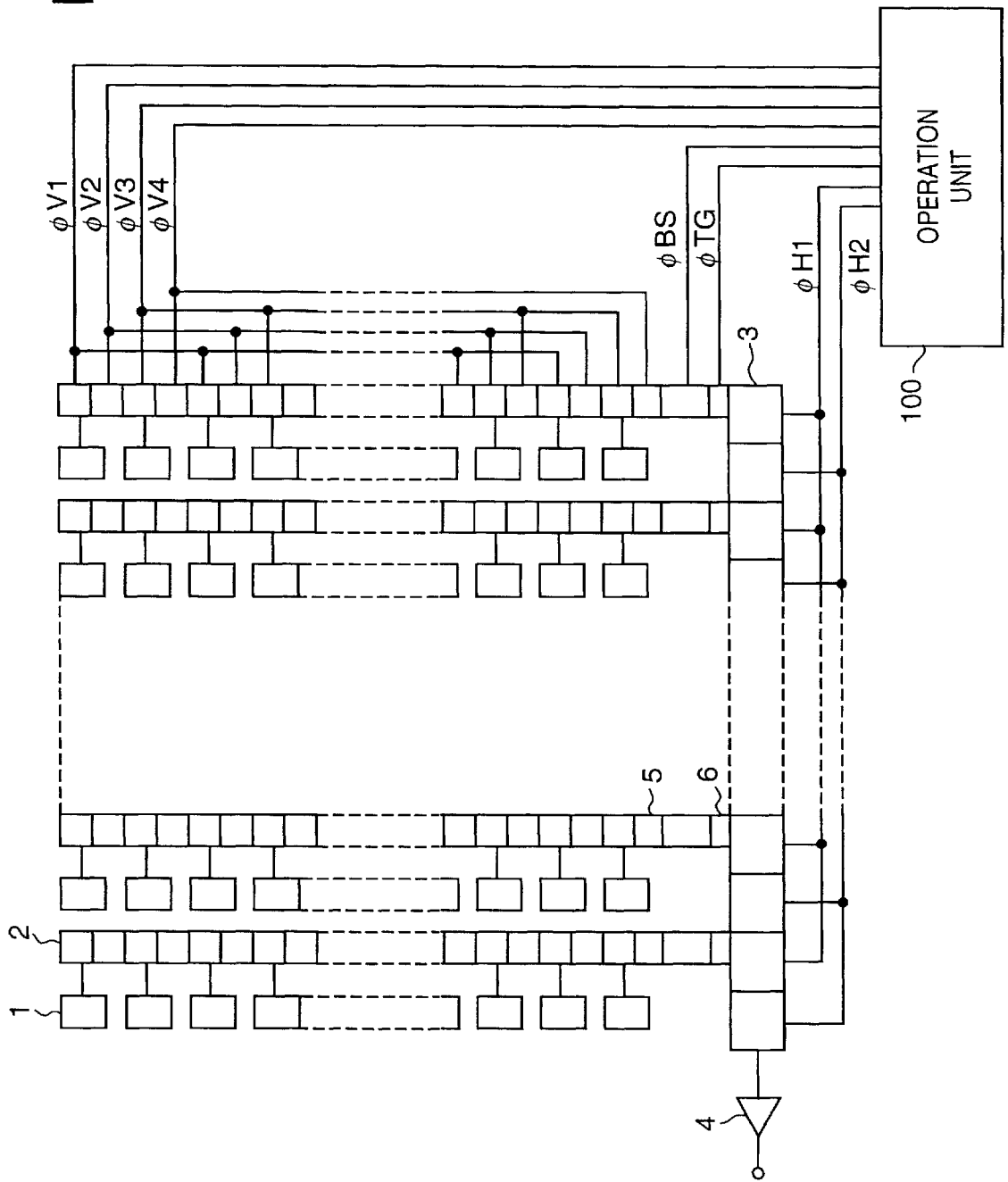
FIG. 1 is a schematic illustrating a configuration of an image sensing device (CCD) according to a first embodiment of the present invention.

FIG. 1 is a schematic illustrating a configuration of an image sensing device (CCD) according to the first embodiment of the present invention. In FIG. 1, reference numeral 1 denotes photodiodes (PDs) and reference numeral 2 denotes four-phase drive vertical charge coupled devices (VCCDs) as a plurality of vertical shift registers for transferring signal charges. A readable area, which is configured with PDs 1 and VCCDs 2, of the CCD is the same as that of the conventional CCD.

Reference numeral 3 denotes horizontal charge coupled device (HCCD) as a horizontal shift register for transferring signal charges, stored in the readable area, by line, and reference numeral 4 denotes an output amplifier for converting a signal charge of each pixel which is transferred via the HCCD 3 into a voltage signal. The HCCD 3 and the output amplifier 4 also have the same configuration as those of the conventional CCD.

The element which is different from the conventional CCD is buffer storage cells (BSCs) 5 for temporarily storing signal charges of a line which are transmitted from the VCCDs 2 before being transferred to the HCCD 3, and transfer gates (TGs) 6 provided between the BSCs 5 and respective elements of the HCCD 3.

Note, the HCCD 3 is provided at either ends of the VCCDs 2, and transfers signal charges, transferred via the VCCDs 2, of one or n (positive integer) lines.

Further, φV1 to φV4 denote operation signals, having different phases from each other, for operating the VCCDs 2; φH1 and φH2, operation signals for operating the HCCD 3; φBS, an operation signal for operating the BSCs 5; and φTG, an operation signal for operating the TGs 6. The CCD according to the first embodiment is operated by an operation unit 100 which controls the signal levels and timing of the above operation signals.

Figure 11:
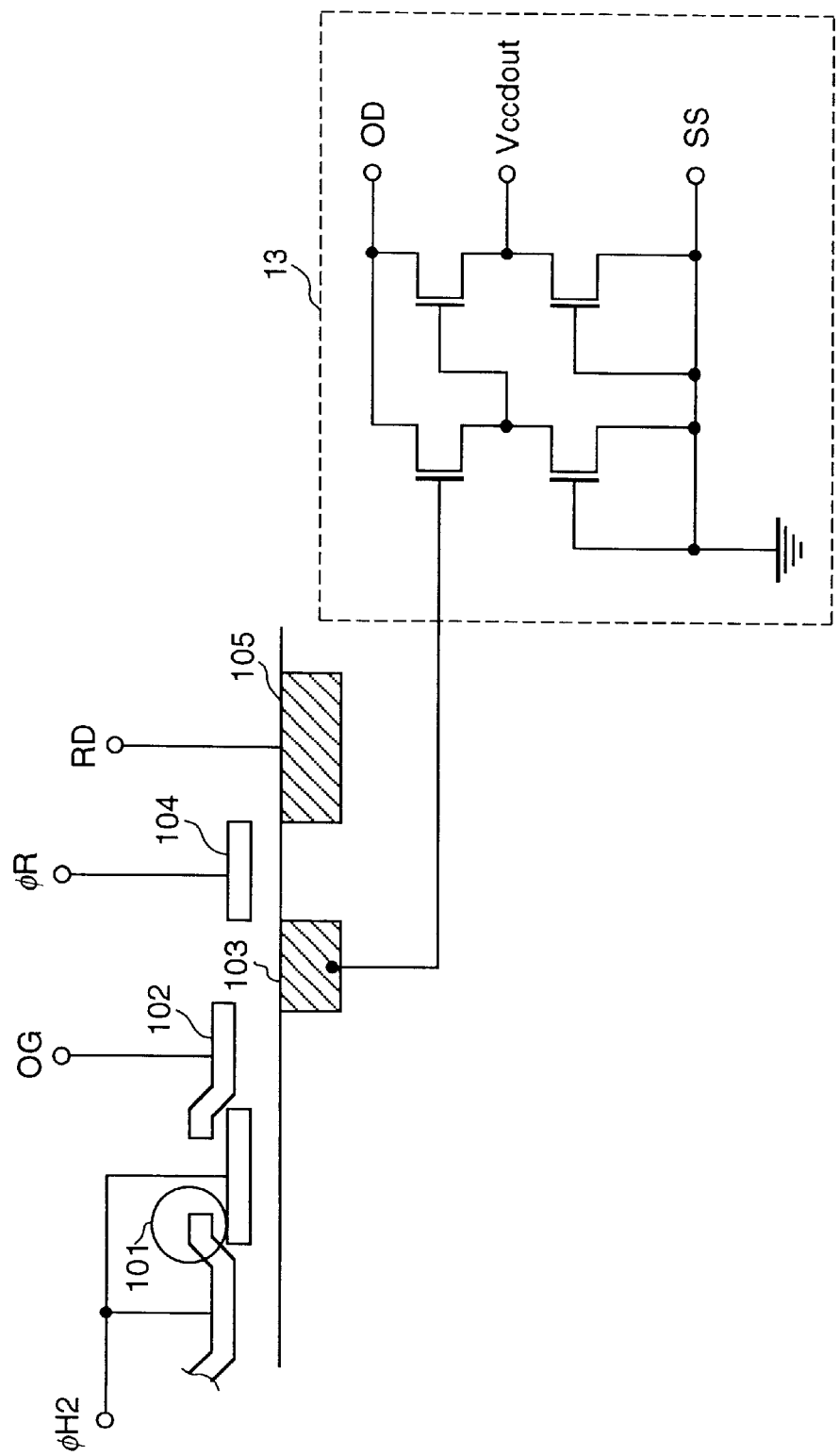
FIG. 11 is a schematic illustrating a configuration of an output unit of a conventional CCD.
Figure 12:
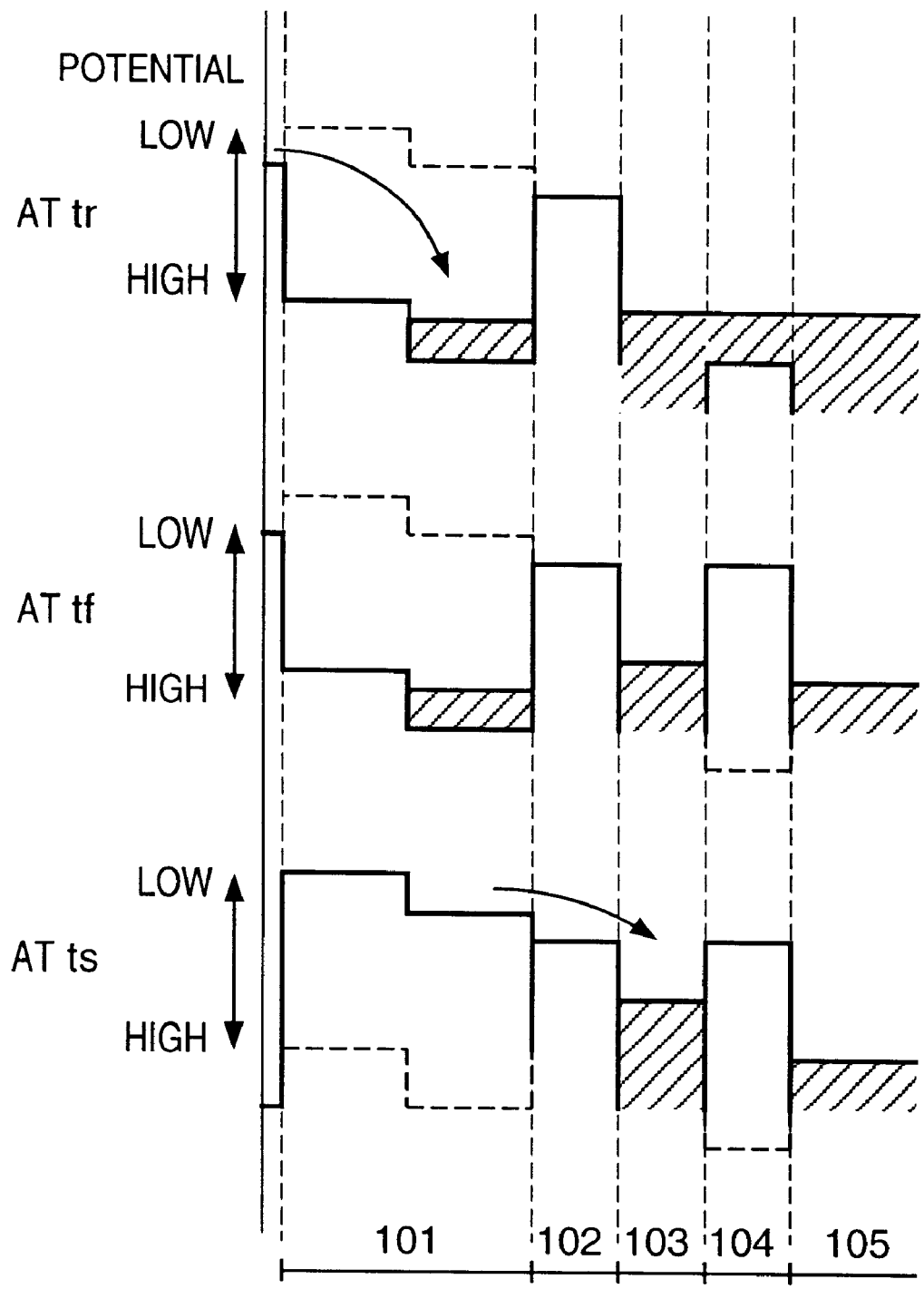
FIG. 12 is an explanatory view showing an operation of the output unit of the conventional CCD.
Figure 13:
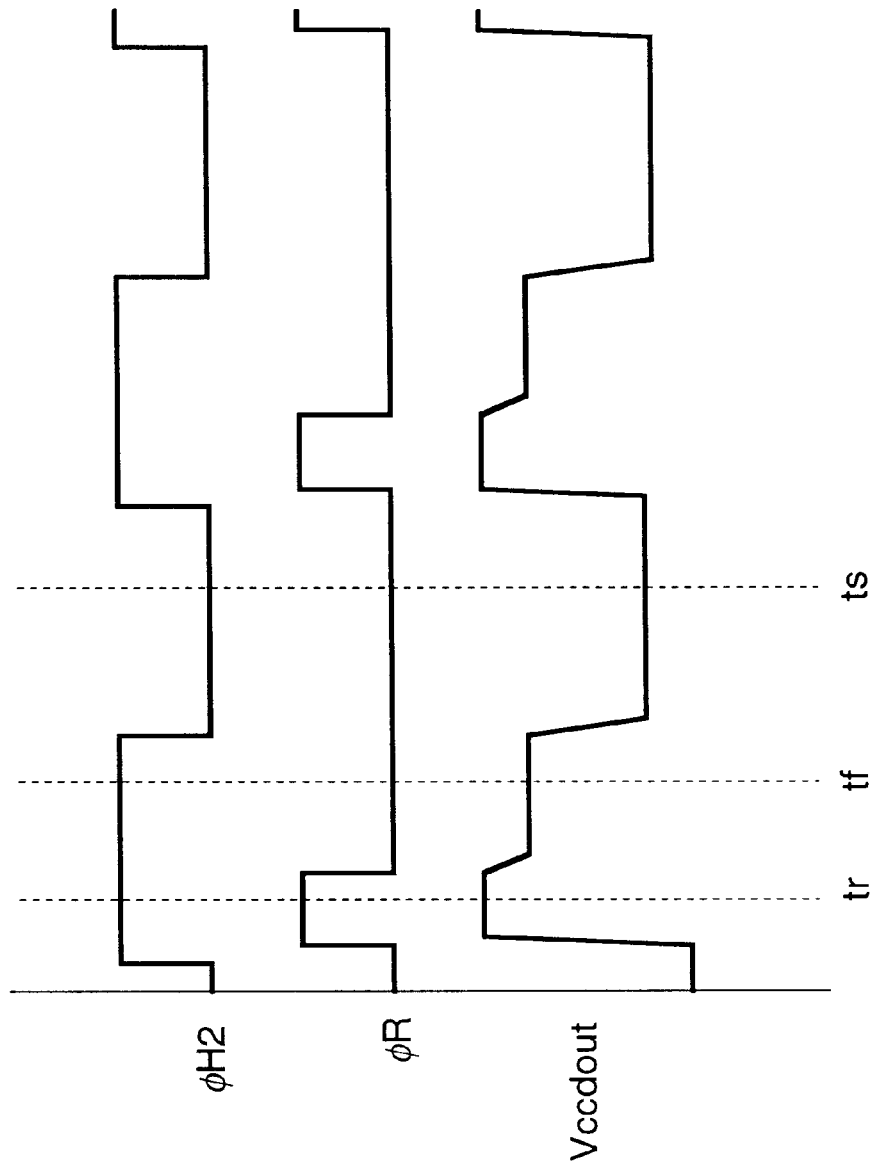
FIG. 13 is a timing chart showing an operation of the conventional CCD.
Figure 14:
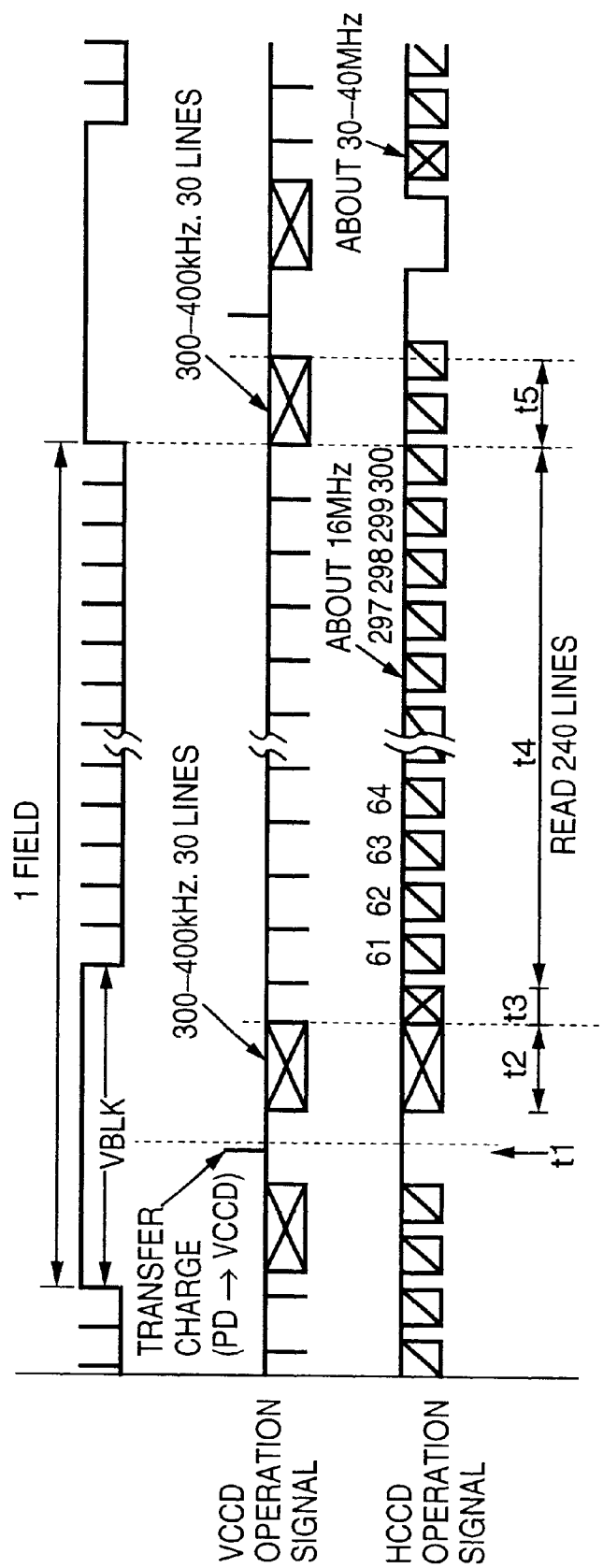
FIG. 14 is a timing chart showing an operation of the conventional CCD.
Figure 18:
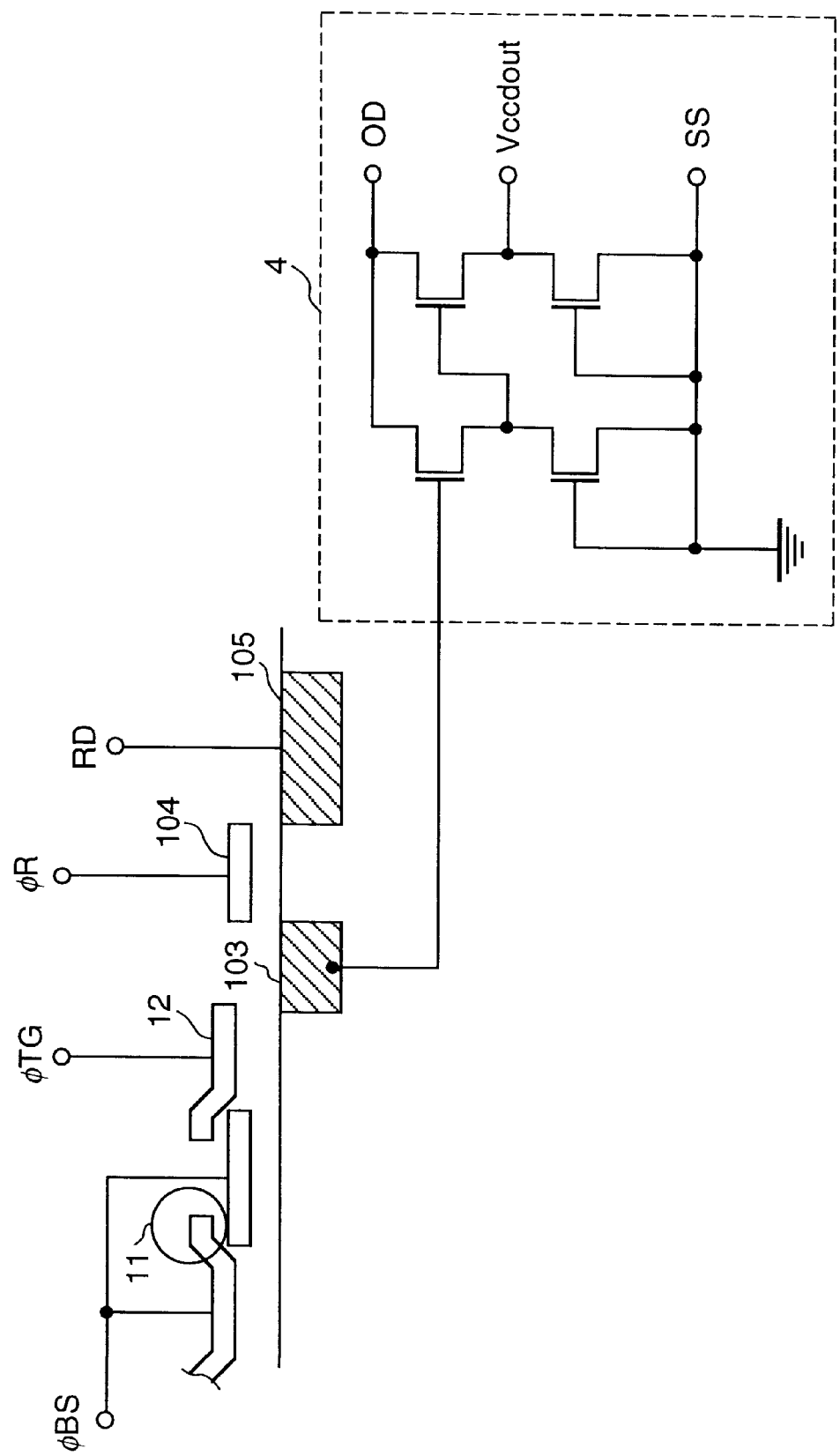
FIG. 18 is a schematic illustrating a configuration of an output unit of the CCD according to the first embodiment of the present invention.

FIG. 18 is a schematic illustrating a configuration of an output unit of the CCD. In FIG. 18, reference numeral 11 denotes one of the BSCs 5, and 12 denotes one of the TGs 6. Other elements are the same as those of the conventional configuration explained with reference to FIG. 11, thus explanation of them are omitted.

Figure 2:
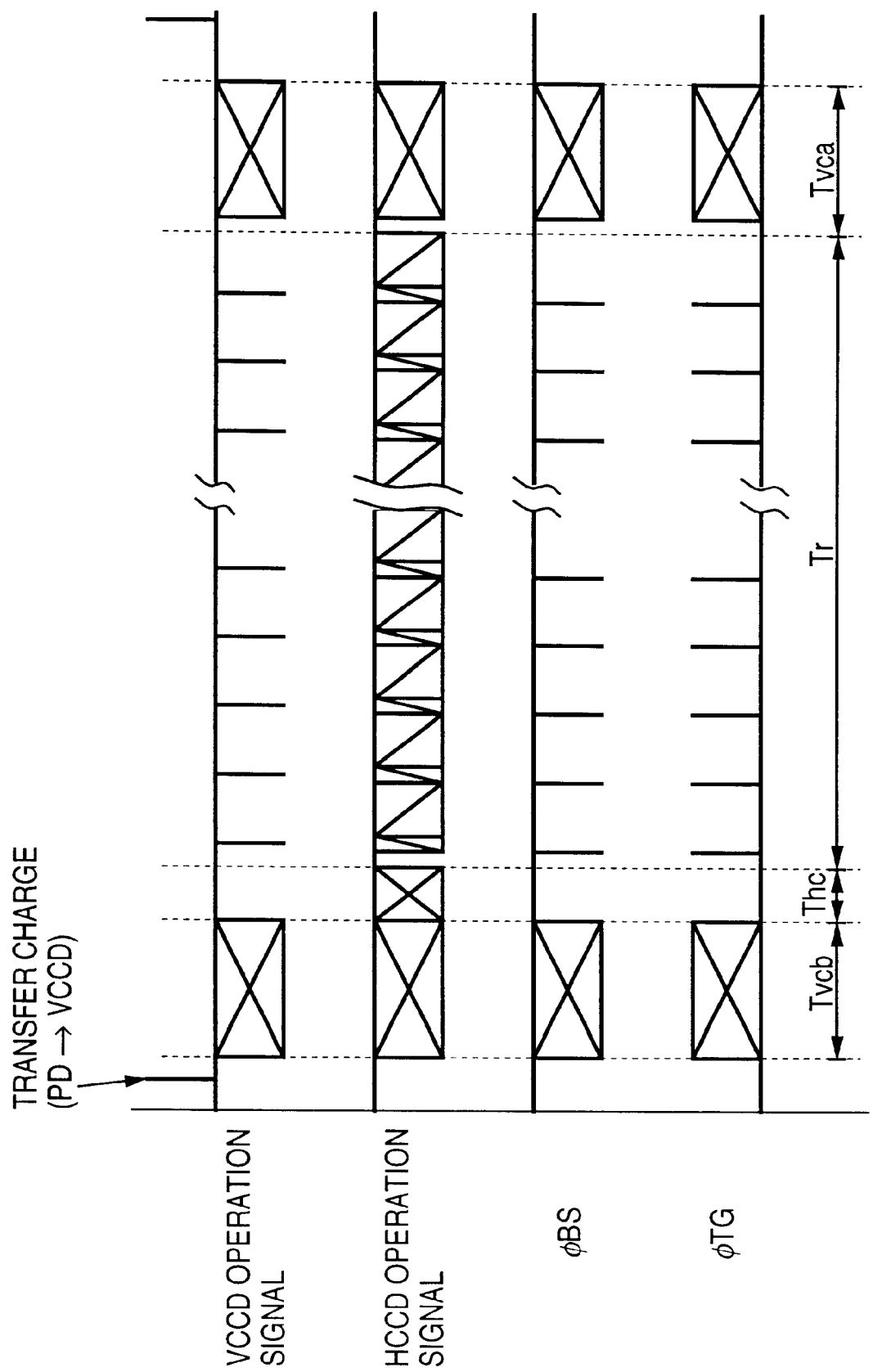
FIG. 2 is a timing chart showing an operation of the CCD according to the first embodiment.
Figure 3:
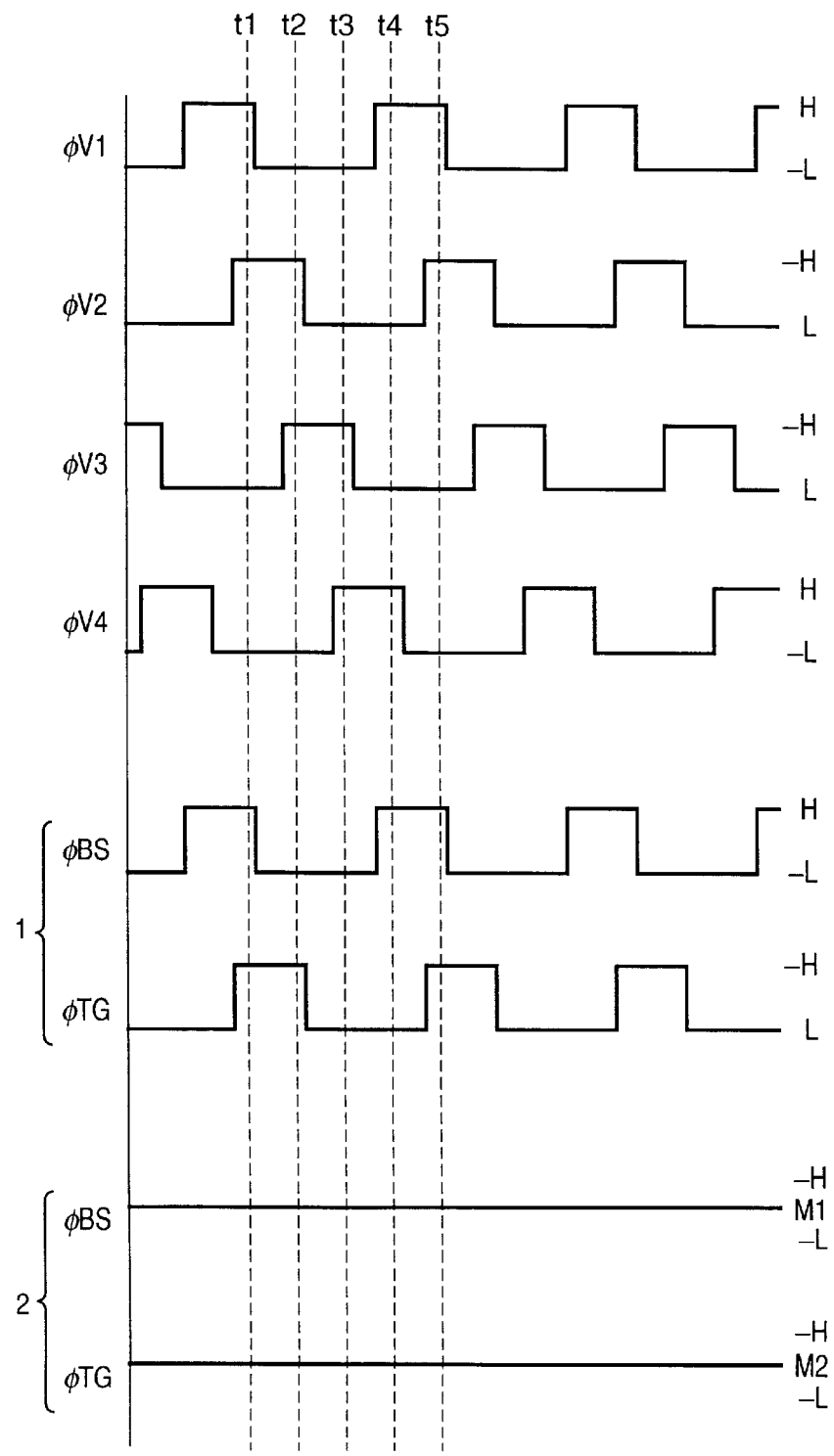
FIG. 3 is a timing chart showing an operation of the CCD according to the first embodiment.
Figure 6:
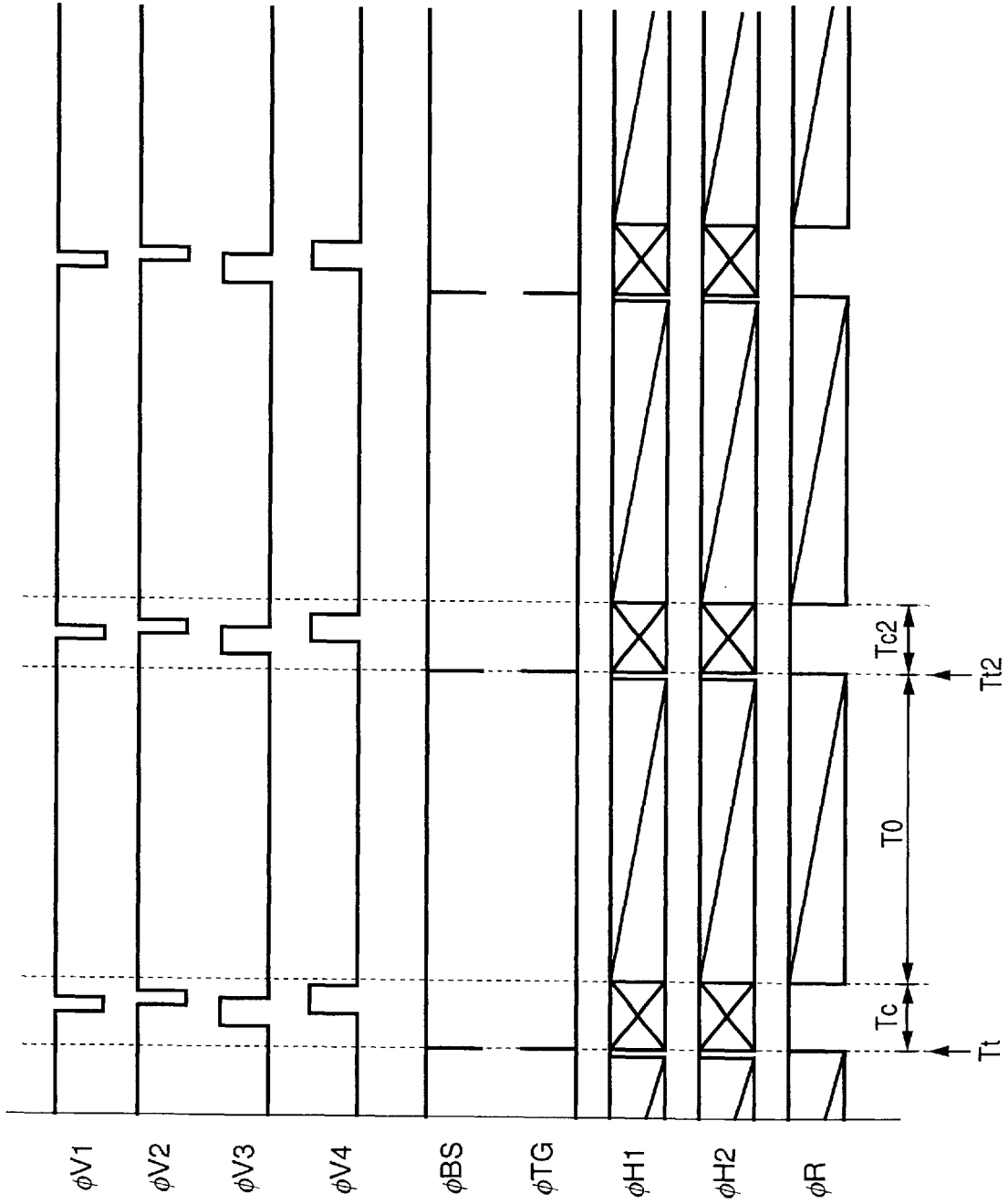
FIG. 6 is a timing chart showing an operation of the CCD according to the first embodiment.
Figure 7:
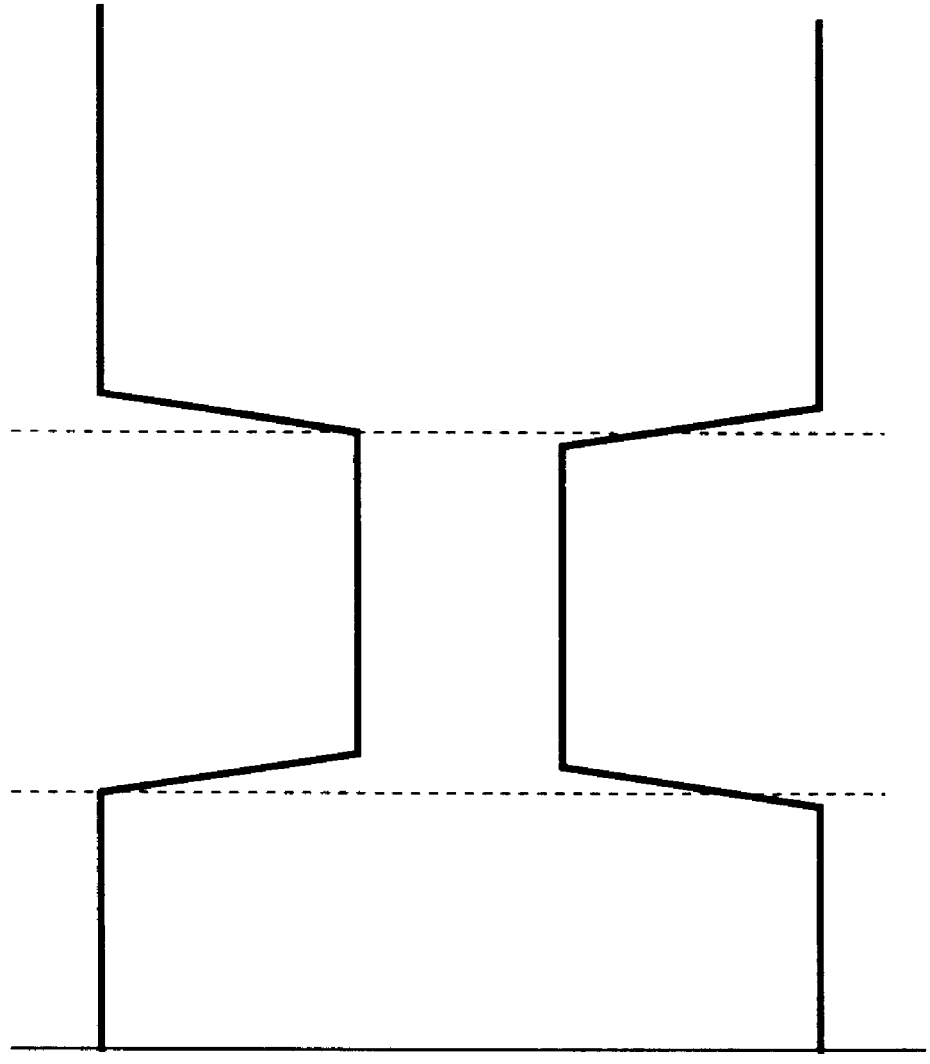
FIG. 7 is a timing chart showing an operation of the CCD according to the first embodiment.

FIGS. 2, 3, 6 and 7 are timing charts showing operational timing of partial scanning operation of the CCD. FIG. 2 shows the operation in one field period; FIG. 3 shows operational signals when discarding signal charges while transferring charges at high speed in the vertical direction; FIG. 6 shows operation signals for scanning specific lines; and FIG. 7 is an enlarged view of the signal φBS and the signal φTG at time Tt and Tt2.

Figure 4:
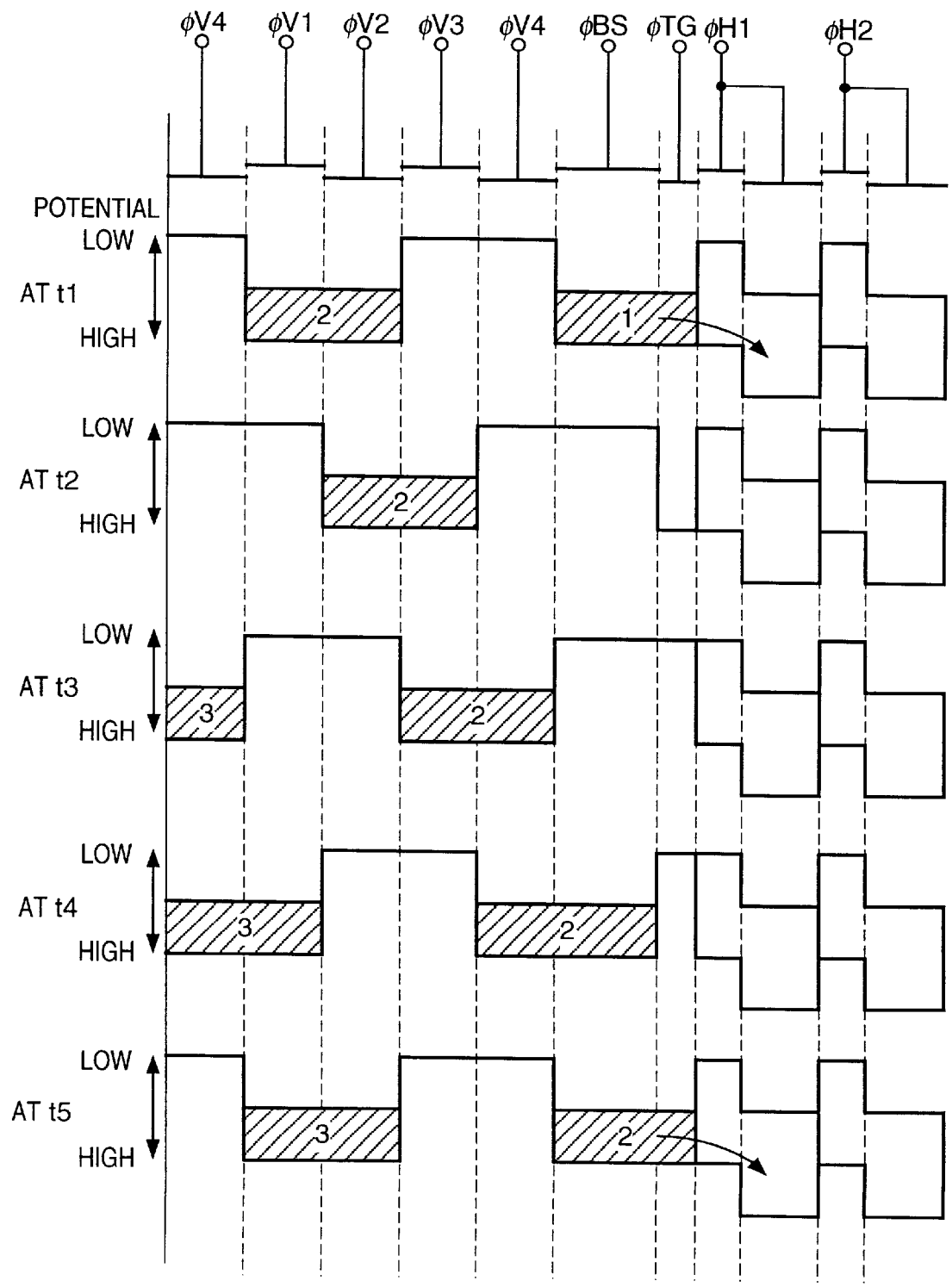
FIG. 4 is a view showing a transition of a potential profile of the CCD according to the first embodiment.
Figure 5:
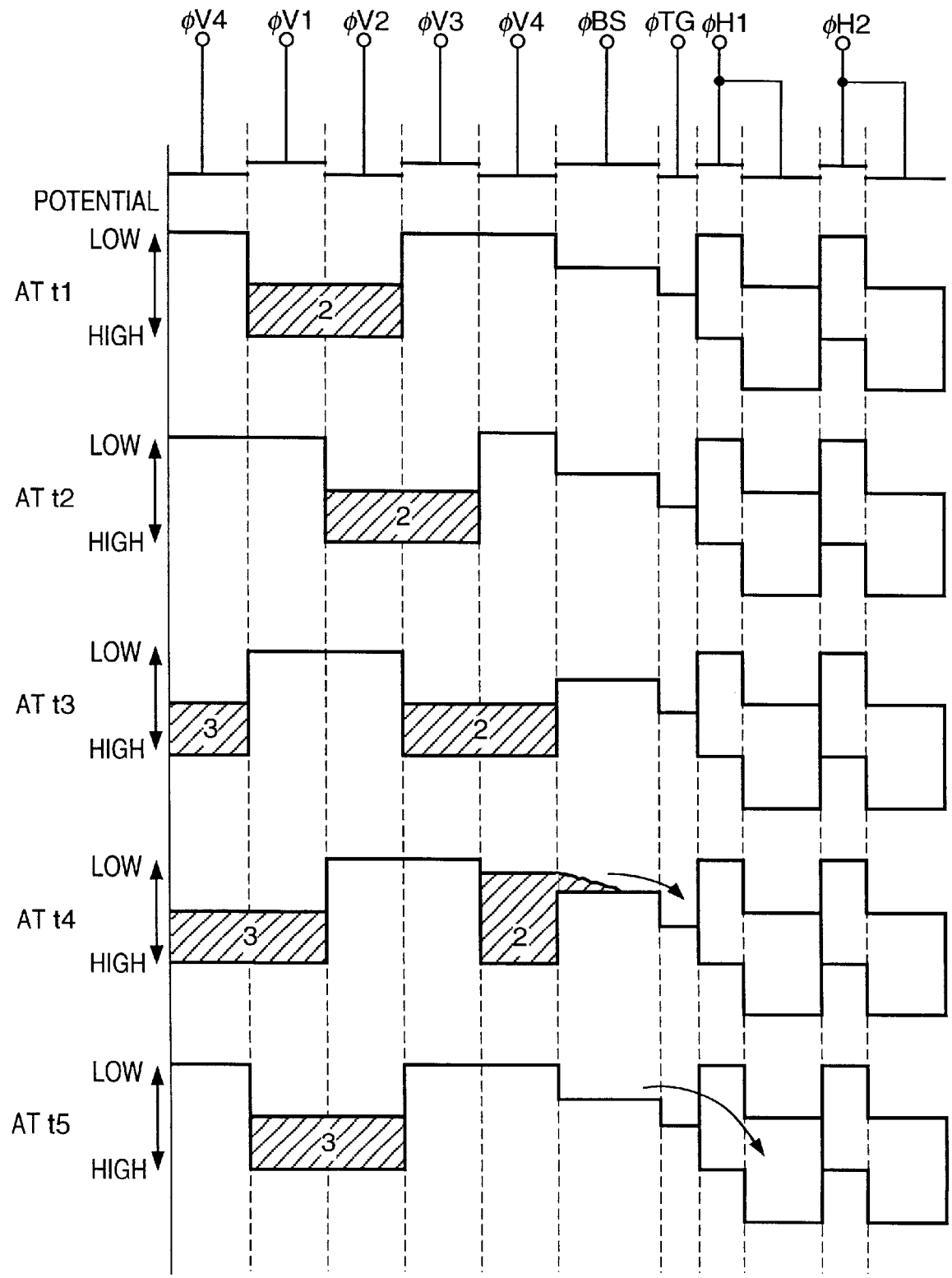
FIG. 5 is a view showing a transition of a potential profile of the CCD according to the first embodiment.
Figure 8:
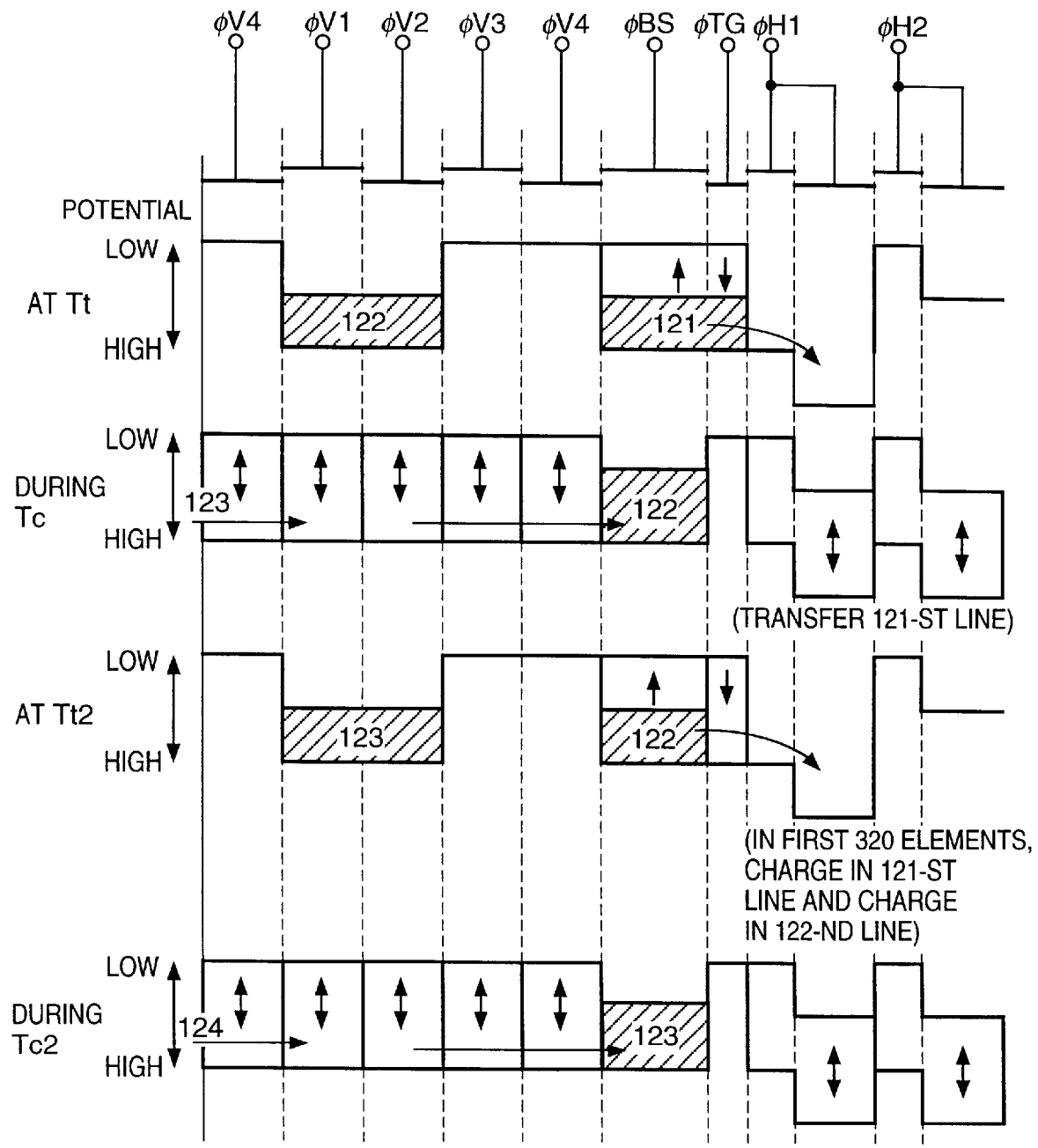
FIG. 8 is a view showing a transition of a potential profile of the CCD according to the first embodiment.

FIGS. 4, 5 and 8 show a brief configuration from an end element of the VCCD 2 to the HCCD 3 via the BSC 5 and TG 6, and potential diagram for explaining the operation of each portion. More specifically, FIGS. 4 and 5 show potential profiles when discarding charges at high speed in the vertical direction and correspond to FIG. 3, and FIG. 8 is a potential profile when scanning a predetermined portion of the readable area of the CCD (referred to as "specific area" hereinafter).

Figure 9A:
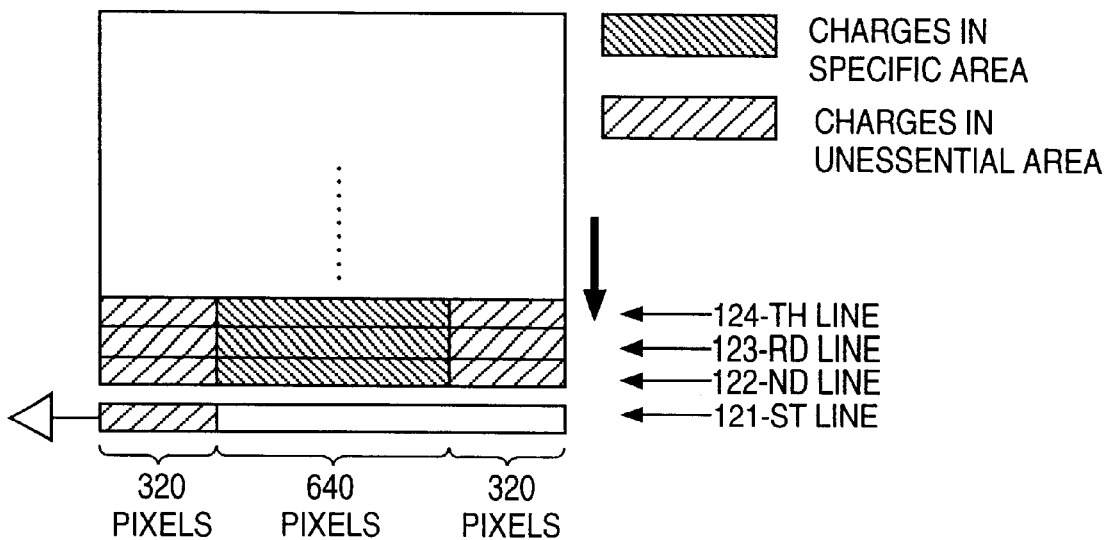
FIGS. 9A and 9B are views schematically showing a transference of charges in the CCD according to the first embodiment of the present invention.
Figure 9B:
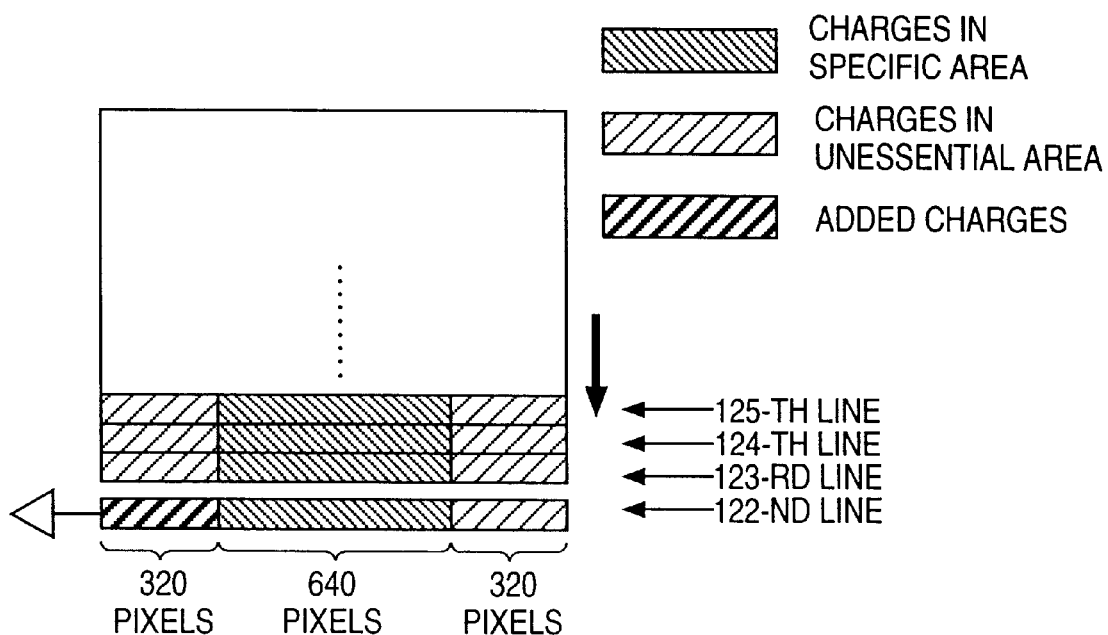

Further, FIGS. 9A and 9B are views showing a concept of shortening time while discarding unessential charges when reading lines which are included in the specific area. Below, partial scanning of the CCD in a case where it is used in a digital still camera is explained. As an example, central 640×480 pixels are read out from a 1280×960-pixel CCD.

In a digital camera, although the image is read in the field mode or in the frame mode for obtaining an image to be displayed on a finder screen, there is no operational limitations due to a video signal format, such as NTSC and PAL. Accordingly, there is a demand for taking an image in the possible shortest time for the digital camera. First, signal charges are transferred from the PDs 1 to the VCCDs 2, and signal charges of first 120 lines (=((960/2)−(480/2))/2) are discarded in period Tvcb in FIG. 2. The shortest time for performing the partial scanning operation is delimited by the maximum transfer speed in the VCCDs 2, as described above for the conventional CCD. Further, transfer operation in the VCCDs 2 and the HCCD 3 are also the same as that of the conventional CCD.

FIG. 3 shows a part of the operation signals φV1 to φV4, φBS and φTG during discarding charges of 120 lines in the period Tvcb in FIG. 2, and the signals φBS and φTG are as either (1) or (2) in FIG. 3.

In (1), the phase of the signal φBS is the same as that of the signal φV1, and the phase of the signal φTG is the same as that of the signal φV2 (the signals φBS and φTG may have the same phase).

In (2), grid biases between High level and Low level are applied as φBS and φTG. At this time, proper potential differences are provided between φBS and φTG, as described below.

FIG. 4 shows a transition of a potential profile of the output portion of the CCD when the signal levels of φBS and φTG are controlled as shown by (1) in FIG. 3, and FIG. 5 shows a transition of a potential profile of the output portion of the CCD when the signal levels of φBS and φTG are controlled as shown by (2) in FIG. 3. In FIGS. 4 and 5, t1 to t4 corresponds to t1 to t4 in FIG. 3, and depths of potential wells and how signal charges are transferred are shown when signal levels at the respective time are applied to the BSC 5 and TG 6.

Note, when φBS and φTG are as shown by (2), as described above, the potential well of the TG 6 is controlled so as to be deeper than the potential well of the BSC 5, in other words, a signal level of φBS is properly lower than a signal level of φTG. By controlling the φBS and φTG in this manner, it is possible to transfer signal charges to the HCCD 3 by lowering the potential of φV4 than the potential of the φBS without changing signal levels of the φBS and φTG.

During the period Tvcb in FIG. 2, the operation signals are controlled as shown in FIG. 3. At the time of finishing discarding signal charges of the unessential 120 lines, signal charges of the 121-st line are stored in the BSCs 5, and signal charges of the 122-nd line are transferred to the last elements of the VCCDs 2 which are controlled by the signals φV1 and φV2.

Next, scanning operation of essential lines, performed during periods Thc and Tr in FIG. 2, after finishing discarding signal charges of the unessential 120 lines is explained with reference to FIG. 2 and FIG. 6 which shows a part of operation during the period Tr.

After transferring unessential charges of the 120 lines at high speed, 1280 sets (correspond to the number of pixels in a line) of transfer pulses, at least, are applied to the HCCD 3 during the period Thc in order to discard unessential charges in the HCCD 3 (i.e., residual charges after the high speed discarding operation). Thereafter (operation until this stage is called "primary high-speed vertical charge discarding mode" hereinafter), by changing the potential level of the signal φBS from High to Low simultaneously with opening the TGs 6 (i.e., changing the potential level of the signal φTG from Low to High) at time Tt, the signal charges of the 121-st line, which are stored in the BSCs 5 and include charges of the specific area, pass through the TGs 6 and stored in the HCCD 3.

After transferring the signal charges to the HCCD 3, the TGs 6 are closed (i.e., the potential level of the signal φTG is changed from Low to High), and the potential level of the signal φBS is changed from High to Low. FIG. 7 shows an enlarged view of the pulses at time Tt and Tt2 shown in FIG. 6. Upon applying the pulses, it is preferable to slightly delay the time to change the potential of the signal φBS from the time the potential of the signal φTG is changed, as shown in FIG. 7, in consideration of delay of leading and trailing edges of the pulses.

After operating the BSCs 5 and TGs 6 as described above, signal charges corresponding to 320 (=(1280−640)/2) pixels prior to the specific area are transferred through the HCCD 3 at a higher clock frequency than that used for normal scanning operation during period Tc shown in FIG. 6 (ideally, at the highest frequency of horizontal transfer efficiency without deteriorating an image). When the HCCD 3 is operated at 30 MHz, for instance, this operation ends in about 10 μs.

Since the reset gate 104 is kept open for the period Tc as seen from the signal φR (High) shown in FIG. 6, the transferred charges are immediately drained to reset drain 105. The reason for keeping the reset gate 104 opened is to clear unessential charges at high speed and to reduce energy consumption.

Further, during the period Tc, signal charges currently stored in elements of the VCCDs 2 which are operated by the signals φV1 and φV2 are transferred to the subsequent elements which are also operated by the signals φV1 and φV2. Note, the total areas of electrodes, to which the respective signals φV1 to φV4 are applied, of the VCCDs 2 are large since many electrodes are arranged in two dimensions, total capacitances of the electrodes are also large. Accordingly, it takes some µs to 10 plus µs to transfer charges. In this transference performed in the period Tc in FIG. 6, signal charges of the 122-nd line which are currently at the end elements of the VCCDs 2 are transferred to the BSCs 5 and stored there. Note, FIG. 9A and 9B show conceptual views showing movement of signal charges, and at this point, signal charges are in the state shown in FIG. 9A.

Normally, to operate the VCCDs 2 to transfer signal charges in the vertical direction produces large noises which affects the output amplifier 4 of the CCD and an analog signal processing unit provided outside of the CCD. Accordingly, the vertical transfer operation is usually performed during horizontal blanking period in a conventional video camera. In contrast, in the image sensing apparatus according to the first embodiment, it is possible to perform vertical transfer operation during the reading of unessential charges, i.e., when effects of noise do not cause a problem. Therefore, time required for partial scanning can be shortened. A buffer storage line, configured with the BSCs 5 and TGs 6, is used to perform the vertical transfer operation during reading unessential charges.

After the unessential charges of first 320 pixels in the 121-st line are discarded, signal charges of successive 640 pixels, i.e., pixels in the specific area, at the central portion of the 121-st line are read in period To in FIG. 6 at a normal scanning speed. Immediately after the signal charge of the 960-th (=320+640) pixel, namely, the last pixel in the specific area in the line, is read out, the TGs 6 are opened at time Tt2 in FIG. 6. Accordingly, with the signal charges of remaining 320 (=1280−320−640) pixels still in the HCCD 3, signal charges of the 122-nd line are transferred to the HCCD 3 from the BSCs 5. Thereafter, the TGs 6 are closed. Since the total capacitances of electrodes of the BSCs 5 and TGs 6, which are arranged in one dimension, are much smaller than the total capacitances of the electrodes of the VCCDs 2 which spread in two dimensions, high speed operation is possible. The above transfer operation would be finished within some tens of ns.

After finishing the above operation, the BSCs 5 are empty. At this time, the first 320 elements of the HCCD 3 include charges corresponding to the last 320 pixels of the 121-st line and charges corresponding to the first 320 pixels of the 122-nd line. However, since both of the signal charges are to be discarded, no problem arises in adding these signal charges. Note, the state of charges at this point is as shown in FIG. 9B.

Note, if the CCD has the same configuration as a conventional CCD, charges stored at the end of the rows of the VCCDs 2 are transferred to the HCCD 3, although it takes a longer time to transferring charges from the BSCs 5 to the HCCD 3 and it is not possible to transfer charges in the VCCDs during discarding unessential charges. Then, the unessential charges of the last 320 pixels in the previous line and the unessential charges of the first 320 pixels in the subsequent line are added.

After the addition, similar to the operation for discarding the charges of the first 320 pixels as described above, charges of the first 320 pixels in the HCCD 3 are discarded at a higher speed than the normal transfer speed. During discarding of the unessential charges, charges in the VCCDs 2 are also transferred toward the HCCD 3. Accordingly, signal charges of the 123-rd line are stored in the BSCs 5 during period Tc2 in FIG. 6.

In the subsequent operation, the central 240 (=480/2) lines (in the frame mode, 240 lines of one field without combining charges, and in the field mode, 240 lines obtained by combining charges in adjoining lines) are read in the same manner as described above.

In the aforesaid operation according to the first embodiment, the number of clocks required for discarding the unessential charges in lines including the specific area is halved comparing to a case where unessential charges are discarded one by one. Therefore, the total time required for discarding the unessential charges is approximately halved.

After reading charges in the 240 lines which include pixels in the specific area, the signal charges of the remaining 120 lines are discarded at high speed, thereby finishing scanning signal charges for one field. In the subsequent field periods, for partial scanning, similar operation as described above is repeated either in the frame mode or in the field mode.

By operating the CCD (area sensor) of the first embodiment of the present invention in such manner as described above, it is possible to obtain a partial image at very high speed. Further, it is also possible to read an image at video rate when using a high density digital camera.

Note, the capacitance of the BSCs 5 has to be designed larger than that of the capacitance of the VCCDs 2. For instance, by designing the capacitance of the BSCs 5 to be twice larger than the capacitance of the VCCDs 2, it is possible to add signal charges in the BSCs 5.

As a modification of the aforesaid operation, the potential of the TGs 6 may be set to a proper voltage, DC. In such cases, a proper voltage is applied to the TGs 6 or a proper potential is formed by performing ion implantation in the manufacturing process.

In the first embodiment, it is explained as if the number of the elements of the HCCD 3 and the number of pixels in each horizontal line of the CCD are the same. In practice, however, since it is necessary to transfer charges to the output amplifier 4, the number of elements of the HCCD 3 is greater than the number of pixels in each horizontal line. In addition, there are optically black areas in the CCD. However, in order to simplify and clarify the explanation of the present invention, it is assumed that those portions do not exist in the first embodiment. In practically designing the CCD and controlling its operation timing, the features have to be taken into consideration.

<Second Embodiment>

Next, a second embodiment of the present invention will be explained.

Figure 10:
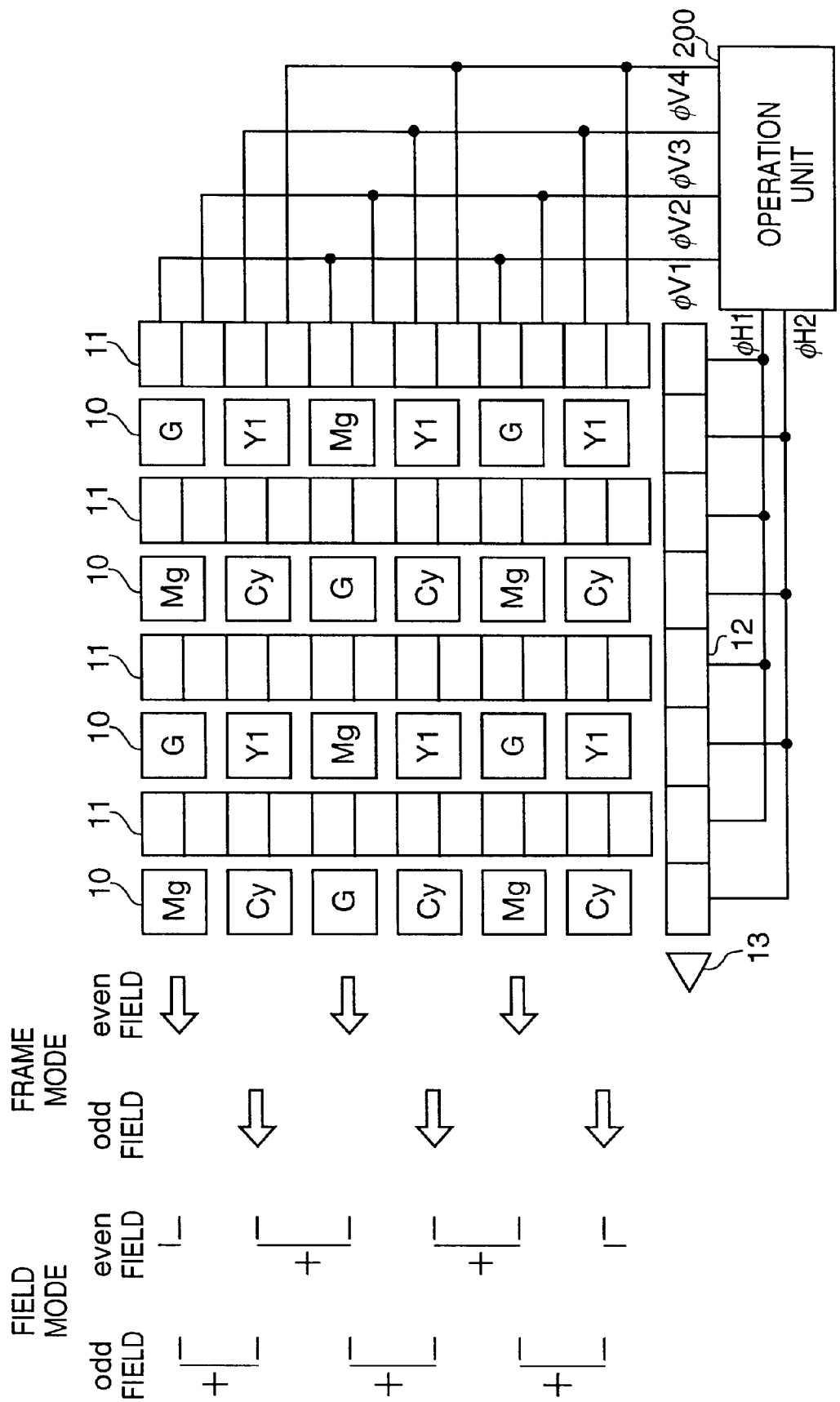
FIG. 10 is a schematic illustrating a configuration of an image sensing device.

A solid-state image sensing device (CCD) according to the second embodiment has approximately the same configuration as that of the conventional CCD explained with reference to FIG. 10. In FIG. 10, reference numeral 10 denotes the PDs which perform photoelectric conversion; 11, the four-phase drive VCCDs for transferring signal charges stored in the PDs 10; 12, the HCCD for transferring signal charges in the readable area of the CCD by line; 13, the output amplifier for converting each signal charge representing a pixel, transferred via the HCCD 12, into a voltage signal, and 200, the operation unit for operating the CCD. However, as described below in detail, the operation unit 200 controls signal levels and timing of the operation signals, φV1 to φV4 and φH1 and φH2, for operating the CCD differently from the control operation adopting the conventional operation method. The operation unit 200 may be realized by a software, or by a hardware. In the latter case, the configuration of the operation unit 200 according to the second embodiment is different from that of a conventional CCD, although this difference is not shown.

The number of pixels of the CCD according to the second embodiment, the specific area, and the unessential area are the same as those in the first embodiment. Further, the CCD according to the second embodiment has a vertical overflow drain, and is capable of draining charges of all the pixels to the substrate by applying a control pulse (Vsub) to the substrate.

Figure 15:
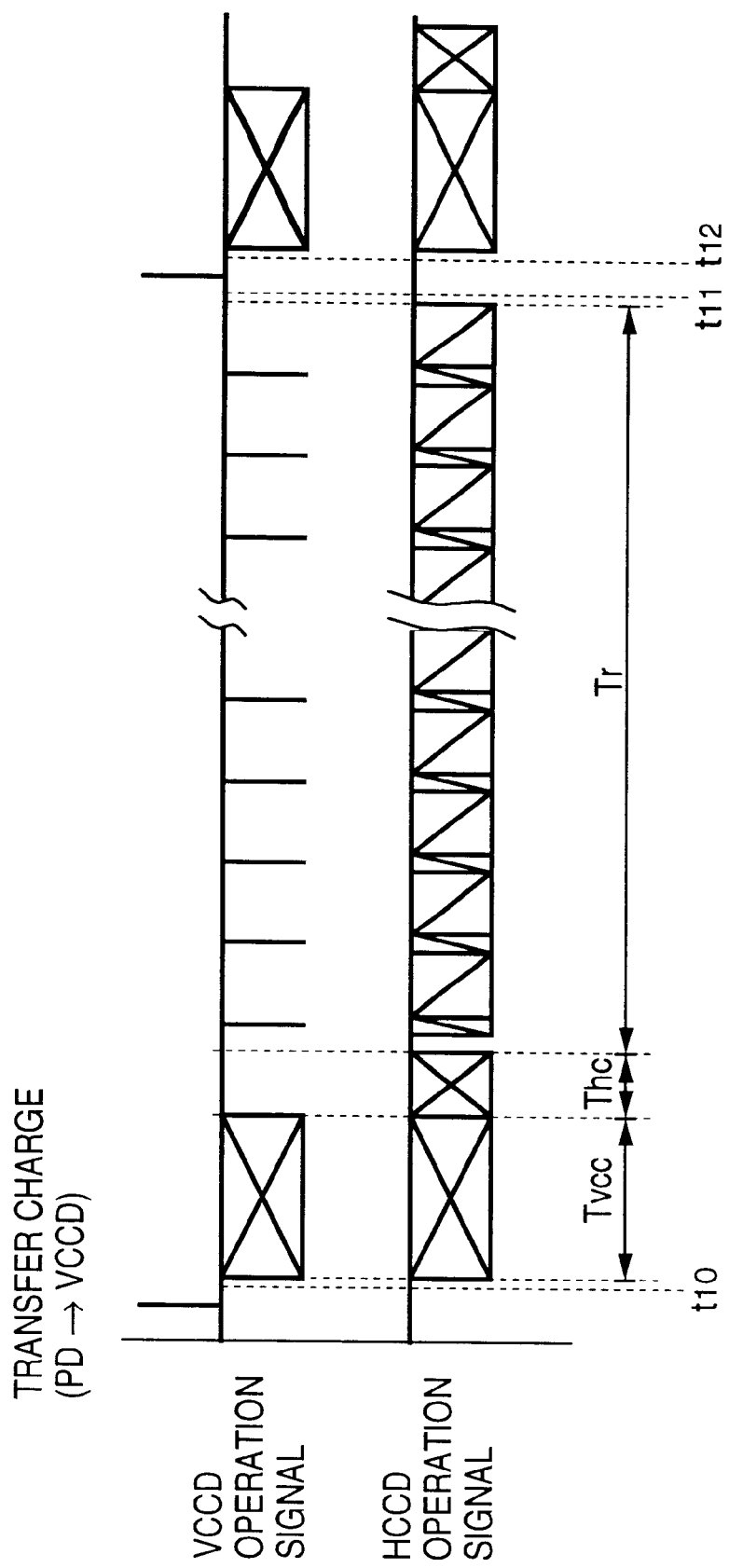
FIG. 15 is a timing chart showing an operation of a CCD according to a second embodiment.
Figure 16A:
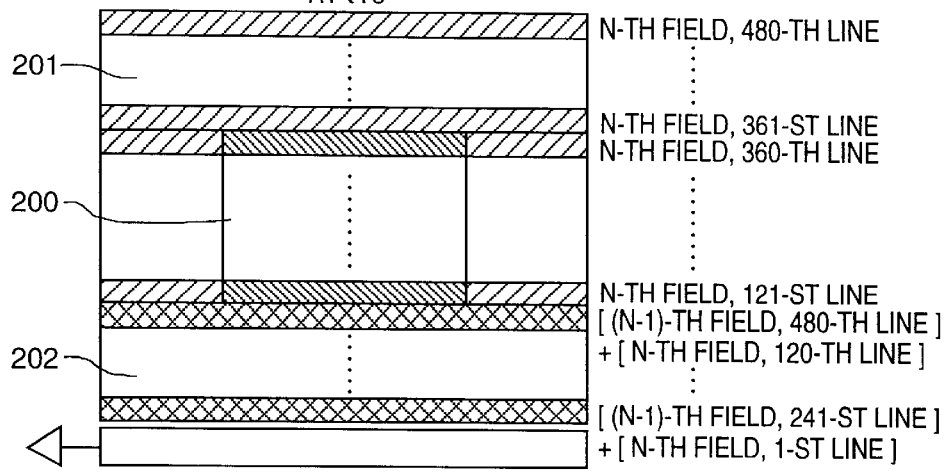
FIGS. 16A to 16C are views schematically showing a transference of charges in the CCD according to the second embodiment of the present invention.
Figure 16B:
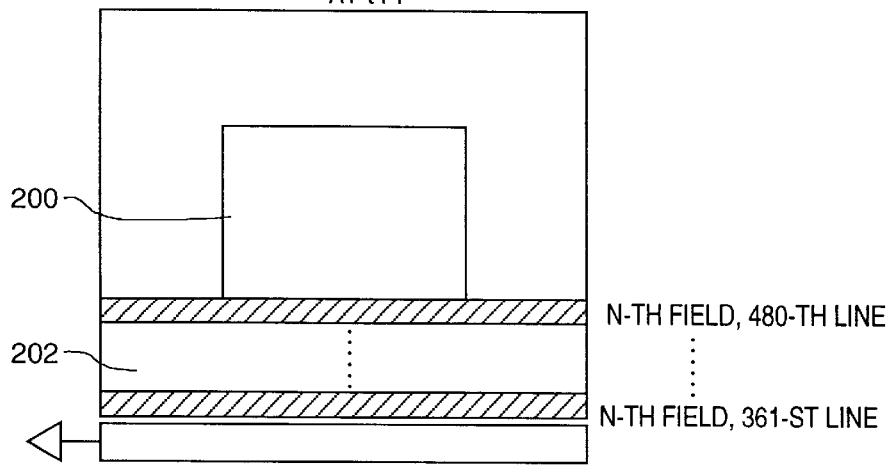
Figure 16C:
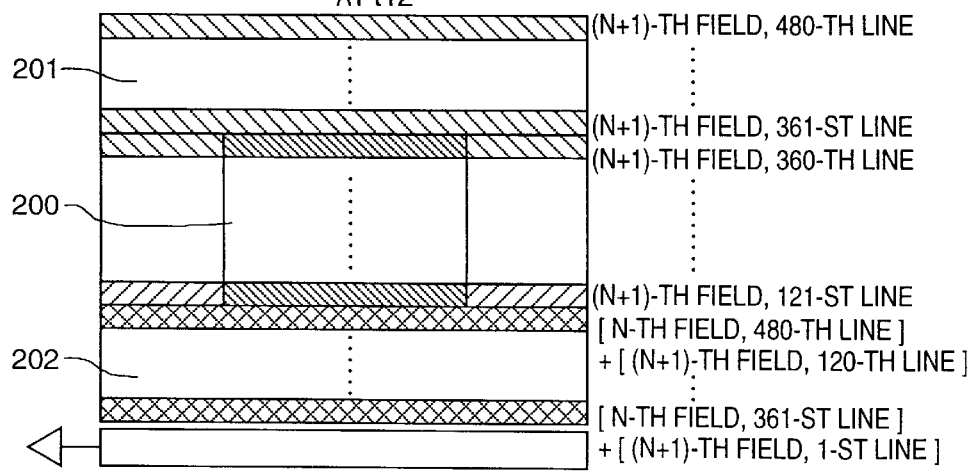

FIG. 15 is a timing chart showing an operation of the CCD in little more than one field period, the N-th field period and beginning of the (N+1)-th field period. FIGS. 16A to 16C are explanatory view for conceptually showing an operation for scanning lower unessential lines in a given field period and upper unessential lines in the subsequent field period jointly in partial scanning operation. More specifically, FIGS. 16A to 16C show the states of charges in the VCCDs 11 of the CCD at time t10, t11 and t12, respectively, in FIG. 15. An area 200 in FIGS. 16A to 16C is the specific area, and an area 201 is an upper unessential area (lines), and an area 202 is a lower unessential area (lines). FIG. 16A shows the state of charges in VCCDs 11 right after a charge transfer pulse in the N-th field period is applied at t10, and signal charges are transferred from the PDs 10 to the VCCDs 11. In the first to 120-th horizontal lines of the VCCDs 11, charges read from the PDs 10 in the (N−1)-th field period remain. In period TVcc in FIG. 15, the charges in the first to 120-th lines are transferred in the vertical direction to be drained at high speed at the same clock rate as that in the period Tvcb in the first embodiment. Next, during period Thc, the transferred unessential charges, remain in the HCCD 12, are transferred to be drained.

Period Tr is for scanning charges from the 121-st line to the 360-th line. During this period, signal charges of the specific area are normally read out, whereas charges of the unessential area located on the right of the specific area in a given line and charges of the unessential area located on the left of the specific area in the subsequent line are read jointly. A method for scanning the charges of the right and left unessential areas is mostly the same as that explained in the first embodiment, thus, only the differing point will be explained below.

Figure 17:
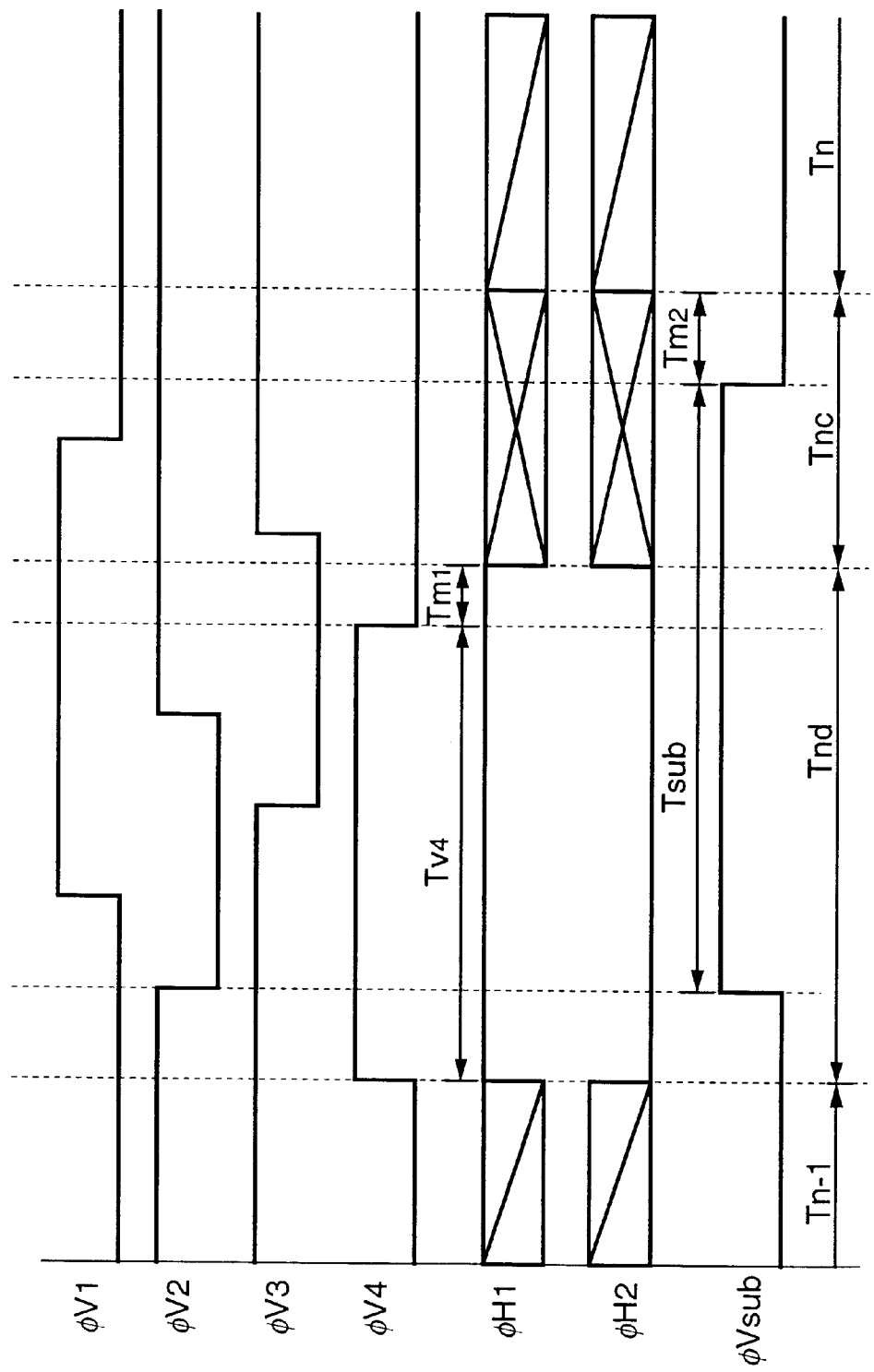
FIG. 17 is a timing chart showing an operation of the CCD according to the second embodiment.

FIG. 17 is a timing chart showing the horizontal blanking period between the (n−1)-th line and the n-th line in the period Tr. In FIG. 17, period Tn−1 is for reading signal charges of the specific area in the (n−1)-th line, and after the period Tn−1, charges of the right unessential area in the (n−1)-th line remain in the HCCD 12. Note, as described in the first embodiment, the charges of the right unessential area of the (n−1)-th line remaining in the HCCD 12 are transferred toward the output amplifier 13 so that they do not mixed with signal charges of the specific area in the n-th line, as shown in FIGS. 9A and 9B.

Period Thd is for transferring signal charges from the VCCDs 11 to the HCCD 12, and the charges of the right unessential pixels in the (n−1)-th line and charges of the left unessential pixels in the n-th line are added. In period Tv4, when the signal φV4 is High, charges, stored in elements of the VCCDs 11 to which the signal φV4 is applied, are transferred toward the HCCD 12. Period Tm1 is a margin period since the transference of charges in the VCCDs 11 is finished after the signal φV4 becomes low until charges of one line are completely transferred to the HCCD 12. Period Tnc is for reading the charges of the right unessential pixels in the (n−1)-th line and the charges of the left unessential pixels in the n-th line jointly. After this period, signal charges of the specific area in the n-th line is read in period Tn. By repeating the aforesaid operation, charges of the specific area are normally read out while charges of the unessential pixels in the successive two lines are read jointly.

In a conventional solid-state image sensing apparatus for video, vertical transfer pulses φV1 to φV4, and a pulse φVsub for draining charges in the PDs 10 to the substrate are commonly applied while horizontal transfer pulses φH1 and φH2 are fixed to predetermined potentials. In contrast, in the second embodiment, a part of the pulses φV1 to φV4 and φVsub are applied in the period Tnc. Period Tsub is when the pulse φVsub for draining charges in the PDs 10 to the substrate is applied, and the pulse φVsub gives a noise to a signal outputted from the output amplifier 13, similarly to the vertical transfer pulses.

However, in the period Tnc, since charges of the unessential pixels in the two successive lines are read together and they are not used as image signals, the noise due to the pulse φVsub does not matter. By operating the CCD in the above manner, it is possible to shorten scanning period.

Period Tm2 starts at the end of the period Tsub and ends at the beginning of the period Tn, and is a margin period so that the pulse φVsub for draining signal charges from the PDs 10 to the substrate does not affect image signals of the specific area.

FIG. 16B shows the state of charges in VCCDs 11 right after charges in the 360-th line have been read out at time t11. As shown in FIG. 16B, charges in the upper unessential area of the N-th field remains in the VCCDs 11 of the CCD and they have been transferred to the portion of the VCCDs 11 lower than the specific area.

FIG. 16C shows the state of charges in the VCCDs 11 right after the pulse for transferring the PDs 10 to the VCCDs 11 in the (N+1)-th field period is applied at time t12. Although the charges of the N-th field remain in the first to 120-th lines, since charges of the specific area are not added to the remaining charges, as seen in FIG. 16C, there is no problem on operating the CCD in this manner.

By performing partial scanning by repeating the aforesaid processes explained in the second embodiment, it is possible to read signal charges of a specific area at high speed.

<Modifications>

(1) In the first and second embodiments of the present invention, the four-phase drive VCCDs and the two-phase drive HCCD are used, however, the present invention is not limited to this, and the present invention can be applicable to CCDs of other types which can be operated in different manners. For example, the present invention can be applied to a frame-transfer type CCD and a full-frame type CCD.

(2) As an application of the present invention, a sensor may have a gate between each VCCD and HCCD. In this case, the last two elements of the VCCDs operated by signals φV3 and φV4 serve as the buffer storage cells (BSCs). Note, since elements operated by the signal φV4 are at the end of the VCCDs 2 in FIG. 1, when the elements at the end of the VCCDs 2 are operated by the signal φV2, for instance, elements operated by the signals φV1 and φV2 serve as the BSCs.

Furthermore, when the VCCDs are operated by three operation signals, the above idea can be applied. In this case, too, the elements at the end of the VCCDs 2 serve as the BSCs between the VCCDs 2 and the HCCD 3. In the method the elements at the end of the VCCDs 2 instead of the BSCs are used, however, it is necessary to operate the VCCDs 2 for transferring charge to the HCCD 3. Since the total capacitances of the electrodes the VCCDs 2 are much larger than the total capacitance. of the electrodes of the BSCs 5, it takes a longer time for transferring charges from the VCCDs 2 to the HCCD 3. Still, it is possible to shorten time for performing partial scanning comparing to the conventional method.

(3) There is a CCD having a plurality of horizontal registers (HCCDs) for scanning signal charges at high speed in high resolution. The present invention is also applicable to the CCD of this type.

(4) In the first and second embodiments, the ratio of the specific area to the unessential area is ¼ (=½×½), however, the present invention is not limited to this. Further, the specific area needs not be at the center of the readable area of the CCD.

The basic idea of the present invention is to read charges of unessential area jointly, thereby shortening time to scan an image portion. Note, resultant effect for reducing time for reading charges of the specific area depends upon the size and position of the specific area.

(5) When the position of the specific area is changed and/or the ratio of the specific area to the unessential area is changed to other than ¼ (=½×½), there is a possibility that vertical transfer operation can not be performed while discarding unessential charges. In such cases, operation for reading charges of the specific area from the HCCD may be postponed until the vertical transfer operation has completed. Alternately, in a case where vertical transfer operation is performed during reading charges of the specific area, the read image signals including noises may be corrected later.

(6) Better results would be obtained when material, such as aluminum, which has high conductivity is used as electrodes of the BSCs and TGs.

(7) The present invention is not limited to the solid-state image sensing apparatus using charge transfer elements, and can be applicable to a MOS-type solid-state image sensing apparatus using a shift register and an X-Y-address-type solid-state image sensing apparatus.

(8) Charges in the specific area are not only used as an image to be displayed on a finder display but also used for photometry. In the latter case, the essential specific area is very small, therefore, operation at very high speed is possible.

(9) In the second embodiment, depending upon the size and position of the specific area, charges in a predetermined number of lines should be discarded using the same clock rate as that is used in the period Tvcc or of the vertical transfer pulses between the time t11 and time when the transfer pulse for the (N+1)-field period is applied so that all the charges in the upper unessential area of the N-th field are transferred to the area lower than the specific area.

(10) In the second embodiment, charges of a predetermined number of lines may be discarded using the same clock rate as that used in the period Tvcc or of the vertical transfer pulse between the time t11 and time when the transfer pulse for the (N+1)-field period is applied in a margin period to cope with a problem of charge overflow which may be caused by addition of signal charges.

(11) In the HCCD in the first and second embodiments, charges of a predetermined number of pixels may be discarded using the horizontal transfer pulses between the period Tn−1 and the period Thd so that the charges in the right unessential pixels in the (n−1)-th line are properly transferred to the left side of the specific area of the n-th line.

(12) In the HCCD of the first and second embodiments, charges of a predetermined number of pixels may be discarded using the horizontal transfer pulses between the period Tn−1 and the period Thd in a margin period to cope with charge overflow which may be caused by addition of charges of the right unessential pixels in the (n−1)-th line and of the left unessential pixels in the n-th line.

(13) Further, drains (H drains) may be provided along the HCCD for draining excess charges, especially added charges of the unessential area, transferred from the VCCDs, beyond the capacitance of the HCCD. In this case, it is necessary to keep the barrier between the HCCD and the H drains at a proper height. Therefore, it is preferred to use gates to form the barrier so that the height of the barrier can be adjusted. In this configuration, the height of the barrier is controlled so that, when unessential charges are added in the HCCD, excess charges beyond the capacitance of the HCCD does not move into areas where essential charges are stored and are drained to the H drains provided along the HCCD.

According to the present invention as described above, by providing a buffer storage unit or a gate between HCCD and VCCDs, it is possible to transfer signal charges in the VCCDs while reading unessential charges from the HCCD. Further, by operating the HCCD at high speed when reading unessential charges and keeping a gate for a drain opened during reading the unessential charges, high-speed partial scanning from high resolution image sensor is realized.

Further, charges in the upper and lower unessential fields are read jointly, as well as charges in right unessential pixels in a given line and left unessential charges in the next line are also read jointly. Furthermore, all or a part of the vertical charge transfer pulses $\phi V1$ to $\phi V4$ or the pulse $\phi Vsub$ for draining charges in the PDs to the substrate are applied during reading useless charges. Accordingly, it is possible to shorten the time for reading an image portion in a predetermined area and to increase the frame rate without an obtained image signal being affected by noise.

Accordingly, it is possible to increase performance of camera functions, such as video format reading from a high-resolution digital camera, low-resolution sequential photograph taking, electronic zooming, and high-resolution still image taking using a video camera.

Furthermore, it is possible to fill a gap between when a release button of a still-image sensing apparatus is pressed and when an image is actually taken, because it is possible to read photometry data at high speed.

The present invention is not limited to the above embodiments and various changes and modifications can be made within the spirit and scope of the present invention. Therefore to apprise the public of the scope of the present invention, the following claims are made.

What is claimed is:

1. A partial scanning method for reading a necessary charge from a predetermined first area of a solid-state image sensing device and discarding an unessential charge from a second area which is other than the first area, while scanning the solid-state image sensing device having pixel elements for storing charges, vertical charge transfer devices, arranged in parallel, for transferring charges stored in the pixel elements toward a horizontal charge transfer device, and the horizontal charge transfer device for transferring charges to output the charges to outside of the solid-state image sensing device, said method comprising:

a first charge transfer step of transferring charges from the vertical charge transfer devices to the horizontal charge transfer device;

a discarding step of discarding charges, out of the charges transferred in said first charge transfer step, obtained from the second area by operating the horizontal charge transfer device;

a reading step of reading charges, out of the charges transferred in said first charge transfer step, obtained from the first area by operating the horizontal charge transfer device; and a second charge transfer step of, when there is a remaining charge in the horizontal charge transfer device after said reading step, transferring charges from the vertical charge transfer device to the horizontal charge transfer device so that the remaining charge is added to a charge obtained from the second area, wherein said discarding step, said reading step and said second charge transfer step are repeatedly performed during period when charges in horizontal lines, of the solid-state image sensing device, including charges obtained form the first area, are transferred from the vertical charge transfer devices to the horizontal charge transfer device.

2. The partial scanning method according to claim 1, wherein, in said discarding step, the horizontal charge transfer device is operated at higher speed than in said reading step.

3. The partial scanning method according to claim 1 further comprising a step of transferring the remaining charge in the horizontal charge transfer device, before said second charge transfer step, to outside of a portion of the horizontal charge transfer device where a charge obtained from the first area is transferred in said second charge transfer step.

4. The partial scanning method according to claim 1, wherein the horizontal charge transfer device has a horizontal drain for draining charges which exceed a capacitance of the horizontal charge transfer device and a gate capable of changing a height of a wall of the horizontal drain by changing a potential applied to the gate, and, in said second charge transfer step, when charges, transferred from the vertical charge transfer devices to the horizontal charge transfer device, are beyond the capacitance of the horizontal charge transfer device, excess charges are drained.

5. The partial scanning method according to claim 1, wherein, while charges in the horizontal lines of the solid-state image sensing device, said charges only include charges obtained from the second area, are transferred to the horizontal charge transfer device, said first charge transfer step and said discarding step are repeatedly performed.

6. The partial scanning method according to claim 5, wherein said first charge transfer step is performed while said discarding step is performed.

7. The partial scanning method according to claim 6, wherein the horizontal charge transfer device has a horizontal drain for draining charges which exceed a capacitance of the horizontal charge transfer device and a gate capable of changing a height of a wall of the horizontal drain by changing a potential applied to the gate, and, in said first charge transfer step, when charges, transferred from the vertical charge transfer devices to the horizontal charge transfer device, are beyond the capacitance of the horizontal charge transfer device, excess charges are drained.

8. The partial scanning method according to claim 1 further comprising a third charge transfer step of, when there is a remaining charge in the vertical charge transfer devices after all the charges obtained from said first area are transferred to the horizontal charge transfer device, transferring charges from the pixel elements to the vertical charge transfer devices so that the remaining charge is added only to a charge obtained from the second area.

9. The partial scanning method according to claim 8 further comprising a step of transferring the remaining charge in the vertical charge transfer devices, before said third charge transfer step, to outside of an area of the vertical charge transfer devices where a charge obtained from the first area is transferred in said third charge transfer step.

10. A partial scanning method for reading a necessary charge from a predetermined first area of a solid-state image sensing device and discarding an unessential charge from a second area which is other than the first area, while scanning the solid-state image sensing device having pixel elements for storing charges, vertical charge transfer devices, arranged in parallel, for transferring charges stored in the pixel elements toward a horizontal charge transfer device, the horizontal charge transfer device for transferring charges to output the charges to outside of the solid-state image sensing device, and a buffer storage device provided between the vertical charge transfer devices and the horizontal charge transfer device, said method comprising:

a first charge transfer step of transferring charges from the vertical charge transfer devices to the buffer storage device;

a second charge transfer step of transferring charges from the buffer storage device to the horizontal charge transfer device;

a discarding step of discarding charges, out of the charges transferred in said second charge transfer step, obtained from the second area by operating the horizontal charge transfer device;

a reading step of reading charges, out of the charges transferred in said second charge transfer step, obtained from the first area by operating the horizontal charge transfer device;

a third charge transfer step of transferring charges in the vertical charge transfer devices toward the buffer storage device in said discarding step; and a fourth charge transfer step of, when there is a remaining charge in the horizontal charge transfer device after said reading step, transferring charges from the buffer storage device to the horizontal charge transfer device so that the remaining charge is added to a charge obtained from the second area, wherein said discarding step, said reading step, said third charge transfer step, and said fourth charge transfer step are repeatedly performed during period when charges in horizontal lines, of the solid-state image sensing device, including charges obtained from the first area, are transferred from the vertical charge transfer devices to the horizontal charge transfer device.

11. The partial scanning method according to claim 10, wherein, in said discarding step, the horizontal charge transfer device is operated at higher speed than in said reading step.

12. The partial scanning method according to claim 10 further comprising a step of transferring the remaining charge in the horizontal charge transfer device, before said fourth charge transfer step, to outside of a portion of the horizontal charge transfer device where a charge obtained from the first area is transferred in said fourth charge transfer step.

13. The partial scanning method according to claim 10, wherein the horizontal charge transfer device has a horizontal drain for draining charges which exceed a capacitance of the horizontal charge transfer device and a gate capable of changing a height of a wall of the horizontal drain by changing a potential applied to the gate, and, in said fourth charge transfer step, when charges, transferred from the vertical charge transfer devices to the horizontal charge transfer device, are beyond the capacitance of the horizontal charge transfer device, excess charges are drained.

14. The partial scanning method according to claim 10, wherein, while charges in the horizontal lines, of the solid-state image sensing device, which only include charges obtained from the second area are transferred to the horizontal charge transfer device, said first charge transfer step, said second charge transfer step, said discarding step, and said third charge transfer step are repeatedly performed.

15. The partial scanning method according to claim 14, wherein said first charge transfer step and said third charge transfer step are performed while said discarding step is performed.

16. The partial scanning method according to claim 15, wherein the horizontal charge transfer device has a horizontal drain for draining charges which exceed a capacitance of the horizontal charge transfer device and a gate capable of changing a height of a wall of the horizontal drain by changing a potential applied to the gate, and, in said second charge transfer step, when charges transferred from the vertical charge transfer devices to the horizontal charge transfer device are beyond the capacitance of the horizontal charge transfer device, excess charges are drained to the drain.

17. The partial scanning method according to claim 10 further comprising a fifth charge transfer step of, when there is a remaining charge in the vertical charge transfer devices after all the charges obtained from said first area are transferred to the horizontal charge transfer device, transferring charges from the pixel elements to the vertical charge transfer devices so that the remaining charge is added only to a charge obtained from the second area.

18. The partial scanning method according to claim 17 further comprising a step of transferring the remaining charge in the vertical charge transfer devices, before said fifth charge transfer step, to outside of an area of the vertical charge transfer devices where a charge obtained from the first area is transferred in said fifth charge transfer step.

19. A partial scanning method for reading a necessary charge from a predetermined first area of a solid-state image sensing device and discarding an unessential charge from a second area which is other than the first area, while scanning the solid-state image sensing device having pixel elements for storing charges, vertical charge transfer devices, arranged in parallel, for transferring charges stored in the pixel elements toward a horizontal charge transfer device, and the horizontal charge transfer device for transferring charges to output the charges to outside of the solid-state image sensing device, said method comprising:

a charge transfer step of, when there is a remaining charge transferred from the second area at first timing in the vertical charge transfer device after the charges transferred from said first area at the first timing are transferred from the vertical charge transfer devices to the horizontal charge transfer device, transferring charges from the pixel elements to the vertical charge transfer devices at second timing so that the remaining charge is added to a charge transferred from the second area at second timing in said vertical charge transfer devices.

20. The partial scanning method according to claim 19 further comprising a vertical charge transfer step of transferring the remaining charge in the vertical charge transfer devices, before said charge transfer step, to outside of an area of the vertical charge transfer devices where a charge obtained from the first area is transferred in said charge transfer step.

21. The partial scanning method according to claim 20, wherein, in said vertical charge transfer step, the horizontal charge transfer device is operated so as to transfer and drain charges in the horizontal charge transfer device while transferring charges in the vertical charge transfer devices toward the horizontal charge transfer device.

22. The partial scanning method according to claim 20, wherein the horizontal charge transfer device has a horizontal drain for draining charges which exceed a capacitance of the horizontal charge transfer device and a gate capable of changing a height of a wall of the horizontal drain by changing a potential applied to the gate, and, in said vertical charge transfer step, when charges transferred from the vertical charge transfer devices to the horizontal charge transfer device are beyond the capacitance of the horizontal charge transfer device, excess charges are drained to the drain.

23. A solid-state image sensor comprising:

pixel elements for storing charges;

a horizontal charge transfer device, having a plurality of transfer elements for sequentially passing a charge from a transfer element to an adjoining transfer element, for transferring charges to output the charges to outside of the solid-state image sensor;

vertical charge transfer devices, arranged in parallel, for transferring charges stored in the pixel elements toward said horizontal charge transfer device, each of said vertical charge transfer device having a plurality of transfer elements for sequentially passing charges from a transfer element to an adjoining transfer element; and a buffer device having electrodes with a capacitance smaller than the capacitance of electrodes of the vertical charge transfer devices, provided between said vertical charge transfer devices and said horizontal charge transfer device, for enabling to operate said vertical charge transfer devices during operating said horizontal charge transfer device;

wherein said horizontal charge transfer device has a horizontal drain for draining charges which exceed a capacitance of said horizontal charge transfer device, and a gate capable of changing a wall of said horizontal drain by changing a potential applied to the gate.

24. The solid-state image sensor according to claim 23 further comprising:

a charge-voltage converter for converting a charge outputted from said horizontal charge transfer device into a voltage signal; and a drain for draining a charge outputted from said horizontal charge transfer device, wherein when the charge outputted from said horizontal charge transfer device is an unessential charge, the charge is outputted to said drain, whereas when the charge is an essential charge, the charge is outputted to said charge-voltage converter.

25. A solid-state image sensor comprising:

pixel elements for storing charges;

a horizontal charge transfer device, having a plurality of transfer elements for sequentially passing a charge from a transfer element to an adjoining transfer element, for transferring charges to output the charges to outside of the solid-state image sensor;

vertical charge transfer devices, arranged in parallel, for transferring charges stored in the pixel elements toward said horizontal charge transfer device, each of said vertical charge transfer devices having a plurality of transfer elements for sequentially passing a charge from a transfer element to an adjoining transfer element; and a gate having electrodes with a capacitance smaller than the capacitance of electrodes of the vertical charge transfer devices provided between said vertical charge transfer devices and said horizontal charge transfer device and connected to the transfer elements at ends of said vertical charge transfer devices;

wherein said horizontal charge transfer device has a horizontal drain for draining charges which exceed a capacitance of said horizontal charge transfer device, and a gate capable of changing a wall of said horizontal drain by changing a potential applied to the gate.

26. An image sensing apparatus comprising:

a plurality of pixel elements forming an image sensing area for storing charges;

vertical charge transfer devices, arranged in parallel, for transferring charges stored in the pixel elements in the vertical direction, each of said vertical charge transfer devices having a plurality of transfer elements for sequentially passing a charge from a transfer element to an adjoining transfer element;

a horizontal charge transfer device, having a plurality of transfer elements for sequentially passing a charge from a transfer element to an adjoining transfer element, for transferring charges in the horizontal direction; and operation means for reading charges from a predetermined first area of the image sensing area and discarding charges from a second area which is other than the first area by transferring charges from said vertical charge transfer devices to said horizontal charge transfer device, discarding charges out of the transferred charges obtained from the second area by operating said horizontal charge transfer device, reading charges out of the transferred charges obtained from the first area by operating said horizontal charge transfer device, and when there is a remaining charge in the horizontal charge transfer device after reading all the charges from the first area, transferring charges from the vertical charge transfer devices to the horizontal charge transfer device so that the remaining charge is added to a charge obtained from the second area.

27. The image sensing apparatus according to claim 26, wherein the image sensing apparatus is a solid state device.

28. An image sensing apparatus comprising:

a plurality of pixel elements forming an image sensing area for storing charges;

vertical charge transfer devices, arranged in parallel, for transferring charges stored in the pixel elements in the vertical direction, each of said vertical charge transfer devices having a plurality of transfer elements for sequentially passing a charge from a transfer element to an adjoining transfer element;

a horizontal charge transfer device, having a plurality of transfer elements for sequentially passing a charge from a transfer element to an adjoining transfer element, for transferring charges in the horizontal direction; and operation means for reading a charge from a first area of the image sensing area and discarding a charge from a second area, which is other than the first area, by, when there is a remaining charge transferred from the second area at first timing in said vertical charge transfer device after all the charges transferred from said first area at the first timing are transferred from said vertical charge transfer devices to said horizontal charge transfer device, transferring charges from the pixel elements to the vertical charge transfer devices at second timing so that the remaining charge is added to a charge transferred from the second area at second timing in said vertical charge transfer devices.

29. The image sensing apparatus according to claim 28, wherein the image sensing apparatus is a solid state device.

30. An image sensing apparatus comprising:

a plurality of pixel elements forming an image sensing area for storing charges;

vertical charge transfer devices, arranged in parallel, for transferring charges stored in the pixel elements in the vertical direction, each of said vertical charge transfer devices having a plurality of transfer elements for sequentially passing a charge from a transfer element to an adjoining transfer element;

a horizontal charge transfer device, having a plurality of transfer elements for sequentially passing a charge from a transfer element to an adjoining transfer element, for transferring charges in the horizontal direction;

a discarding portion, provided between said vertical charge transfer devices and said horizontal charge transfer device, used for discarding charges from a first area and reading charges from a second area of the image sensing area wherein both of the first area and the second area are included in a row of said plurality of pixel elements; and an operating unit for, while charges transferred from said pixel elements in a predetermined row remain in said horizontal charge transfer device, transferring charges stored in said pixel elements in another row to the horizontal charge transfer device.

31. The image sensing apparatus according to claim 30, wherein said discarding portion comprises a buffer storage element.

32. The image sensing apparatus according to claim 30, wherein said discarding portion comprises a transfer gate.

33. The image sensing apparatus according to claim 30, wherein the image sensing apparatus is a solid state device.

34. A image sensing apparatus comprising:

pixel elements for storing charges;

a horizontal charge transfer device, having a plurality of transfer elements for sequentially passing a charge from a transfer element to an adjoining transfer element, for transferring charges to output the charges to outside of the image sensing apparatus;

vertical charge transfer devices, arranged in parallel, for transferring charges stored in the pixel elements toward said horizontal charge transfer device, each of said vertical charge transfer device having a plurality of transfer elements for sequentially passing a charge from a transfer element to an adjoining transfer element;

a buffer device provided between said vertical charge transfer devices and said horizontal charge transfer device;

a plurality of first pulse input lines, connected to different charge transfer elements of said vertical charge transfer devices, each inputting a common pulse to every predetermined number of the plurality of transfer elements of said vertical charge transfer devices;

a second pulse input line, provided independently of said first pulse input line, for providing a pulse to said buffer device to transfer a charge from said buffer device to said horizontal charge transfer device; and an operating unit for operating said first and second pulse input lines and said horizontal transfer device so as to operate paid vertical charge transfer devices during operating said horizontal charge transfer device.

35. The Solid-state image sensor according to claim 34, wherein each element of said buffer storage devices includes a buffer well for storing charges and a buffer gate having function as a gate between said buffer well and said horizontal charge transfer device.

36. The solid-state image sensor according to claim 34 further comprising:
   a charge-voltage converter for converting a charge outputted from said horizontal charge transfer device into a voltage signal; and
   a drain for draining a charge outputted from said horizontal charge transfer device,
   wherein when the charge outputted from said horizontal charge transfer device into a voltage signal; and
   a drain for draining a charge outputted from said horizontal charge transfer device,
   wherein when the charge outputted from said horizontal charge transfer device is an unessential charge, the charge is outputted to said drain, whereas when the charge is an essential charge, the charge is outputted to said charge-voltage converter.

37. The image sensing apparatus according to claim 34, wherein the image sensing apparatus is a solid state device.

38. An image sensing apparatus comprising:
   pixel elements for storing charges;
   a horizontal charge transfer device, having a plurality of transfer elements for sequentially passing charges from a transfer element to an adjoining transfer element, for transferring charges to output the charges to outside of the image sensing apparatus;
   vertical charge transfer devices, arranged in parallel, for transferring charges stored in the pixel elements towards said horizontal charge transfer device, each of said vertical charge transfer devices having a plurality of transfer elements for sequentially passing a charge from a transfer element to an adjoining transfer element;
   a gate provided between said vertical charge transfer devices and said horizontal charge transfer device and connected to the transfer elements at ends of said vertical charge transfer devices;
   a plurality of first pulse input lines, connected to different charge transfer elements of said vertical charge transfer devices, each inputting a common pulse to every predetermined number of the plurality of transfer elements of said vertical charge transfer devices;
   a second pulse input line, provided independently of said first pulse input line, for providing a pulse to said gate to transfer a charge from said vertical transfer devices to said horizontal charge transfer device; and
   an operating unit for operating said first and second pulse input lines and said horizontal transfer device to operate said vertical charge transfer devices during operating said horizontal charge transfer device.

39. The image sensing apparatus according to claim 38, wherein the imaging sensing apparatus is a solid state device.

40. An image sensing apparatus comprising:
   a plurality of pixel elements forming an image sensing area for storing charges;
   a vertical charge transfer devices, arranged in parallel, for transferring charges stored in the pixel elements in the vertical direction, each of said vertical charge transfer devices having a plurality of transfer elements for sequentially passing a charge from a transfer element to an adjoining transfer element;
   a horizontal charge transfer device, having a plurality of transfer elements for sequentially passing charges from a transfer element to an adjoining transfer element, for transferring charges in the horizontal direction;
   a discarding portion used for discarding charges from a first pixel area and reading charges from a second pixel area, wherein both of the first and second pixel areas are included in each of the plurality of lines formed by said plurality of pixel elements; and
   an operating unit for, while a first charge transferred from a first line of the plurality of lines remain in a first transfer area of said horizontal charge transfer device after the first charge is transferred from a second transfer area of said horizontal charge transfer device, transferring a second charge transferred from a second line of the plurality of lines to the second transfer area.

41. The image sensing apparatus according to claim 40, wherein the image sensing apparatus is a solid state device.

42. An image sensing apparatus comprising:
   a plurality of pixel elements forming an image sensing area for storing charges;
   vertical charge transfer devices, arranged in parallel, for transferring charges stored in the pixel elements in the vertical direction, each of said vertical charge transfer devices having a plurality of transfer elements for sequentially passing a charge from a transfer element to an adjoining transfer element;
   a horizontal charge transfer device, having a plurality of transfer elements for sequentially passing charges from a transfer element to an adjoining transfer element, for transferring charges in the horizontal direction;
   an operating unit for controlling the transferring of charges from a first line to said horizontal charge transfer device under a state that charges from a second line are transferred midway within said horizontal charge transfer device, wherein each of the first and second lines is a separate line formed by said plurality of pixel elements.

43. The image sensing apparatus according to claim 42, wherein the image sensing apparatus is a solid state device.

44. The image sensing apparatus according to claim 42, further comprising a discarding portion used for discarding charges from a first pixel area and reading charges from a second pixel area each included in each of the plurality of lines, wherein both of the first and second pixel areas are included in each of the plurality of lines and each of the plurality of lines is formed by said plurality of pixel elements.

45. The image sensing apparatus according to claim 44, wherein the image sensing apparatus is a solid state device.

46. An image sensing apparatus comprising:
   a plurality of pixel elements forming an image sensing area for storing charges;
   vertical charge transfer devices, arranged in parallel, for transferring charges stored in the pixel elements in the vertical direction, each of said vertical charge transfer devices having a plurality of transfer elements for sequentially passing a charge from a transfer element to an adjoining transfer element;

a horizontal charge transfer device, having a plurality of transfer elements for sequentially passing charges from a transfer element to an adjoining transfer element, for transferring charges in the horizontal direction; and an operating unit for, while a first charge transferred from a first line of the plurality of lines remain in a first transfer area of said horizontal charge transfer device after the first charge is transferred from a second transfer area of said horizontal charge transfer device, transferring a second charge transferred from a second line of the plurality of lines to the second transfer area.

* * * * *

UNITED STATES PATENT AND TRADEMARK OFFICE
CERTIFICATE OF CORRECTION

PATENT NO.   : 6,476,941 B1
DATED        : November 5, 2002
INVENTOR(S)  : Kenichi Kondo et al.

It is certified that error appears in the above-identified patent and that said Letters Patent is hereby corrected as shown below:

<u>Column 1,</u>
Line 66, "HCCD 12 A" should read -- HCCD 12. A --

<u>Column 18,</u>
Line 27, "passing charges from" should read -- passing a charge from --

<u>Column 21,</u>
Line 3, "paid vertical" should read -- said vertical --
Line 31, "passing charges from" should read -- passing a charge from --
Line 37, "towards said" should read -- toward said --
Line 54, "vertical transfer devices" should read -- vertical charge transfer devices --
Line 66, "a vertical charge" should read -- vertical charge --

Signed and Sealed this

Third Day of February, 2004

JON W. DUDAS
*Acting Director of the United States Patent and Trademark Office*